(12) United States Patent
Kondo et al.

(10) Patent No.: US 8,325,802 B2
(45) Date of Patent: Dec. 4, 2012

(54) IMAGE DATA COMPRESSION DEVICE, ENCODER, ELECTRONIC EQUIPMENT AND METHOD OF COMPRESSING IMAGE DATA

(75) Inventors: Yoshimasa Kondo, Matsumoto (JP); Kyoichi Osada, Kofu (JP)

(73) Assignee: Seiko Epson Corporation (JP)

( * ) Notice: Subject to any disclaimer, the term of this patent is extended or adjusted under 35 U.S.C. 154(b) by 332 days.

(21) Appl. No.: 12/704,921

(22) Filed: Feb. 12, 2010

(65) Prior Publication Data

US 2010/0183233 A1 Jul. 22, 2010

Related U.S. Application Data

(63) Continuation of application No. 11/124,806, filed on May 9, 2005, now Pat. No. 7,688,890.

(30) Foreign Application Priority Data

May 10, 2004 (JP) .................................. 2004-139754

(51) Int. Cl.
*H04N 7/12* (2006.01)
(52) U.S. Cl. .......... 375/240.03; 375/240.02; 375/240.12
(58) Field of Classification Search .................. 375/240, 375/240.01, 240.02, 240.03, 240.12, 240.16; 382/100
See application file for complete search history.

(56) References Cited

U.S. PATENT DOCUMENTS

| | | | |
|---|---|---|---|
| 5,729,294 A | | 3/1998 | Linzer et al. |
| 6,310,962 B1 * | | 10/2001 | Chung et al. ................ 382/100 |
| 2003/0112872 A1 * | | 6/2003 | Park et al. ............... 375/240.16 |

FOREIGN PATENT DOCUMENTS

| | | |
|---|---|---|
| JP | 06-268997 | 9/1994 |
| JP | 07-023385 | 1/1995 |
| JP | 07-12752 | 11/1995 |
| JP | 11-122623 | 4/1999 |

OTHER PUBLICATIONS

MPEG-4 Visual Part (Recommendations ISO/IEC 14496-2:1999(E) Annex L), pp. 311-321.
Tsuneo Okubo, et al., "A Hardware/Software Co-design for real-time MPEG2 LSIs", NTT 1997, pp. 609-614.
Communication from Japanese Patent Office regarding counterpart Japanese Patent Application No. 2004-139754, dated Nov. 24, 2005.

* cited by examiner

*Primary Examiner* — Allen Wong
(74) *Attorney, Agent, or Firm* — Harness, Dickey & Pierce, P.L.C.

(57) ABSTRACT

An image data compression device includes a quantization part quantizing image data with a quantization step that varies based on a quantization parameter, a FIFO buffer part buffering quantized data of a plurality of frames, a coded data formation part reading out the quantized data from the FIFO buffer part asynchronously with a writing to the FIFO buffer part and generating coded data by encoding the quantized data, a rate control part controlling a data size of the coded data by changing the quantization step and a frame skip part skipping a generation process of the image data. The rate control part calculates the quantization parameter by using a predicted data size of the coded data of a previous frame which is calculated from a data size of the quantized data of the previous frame. The frame skip part performs the skip process if a frame, in which the quantization parameter becomes larger than a skip threshold, appears consecutively in a number of times which is equal or more than the number of a skip succession threshold.

4 Claims, 27 Drawing Sheets

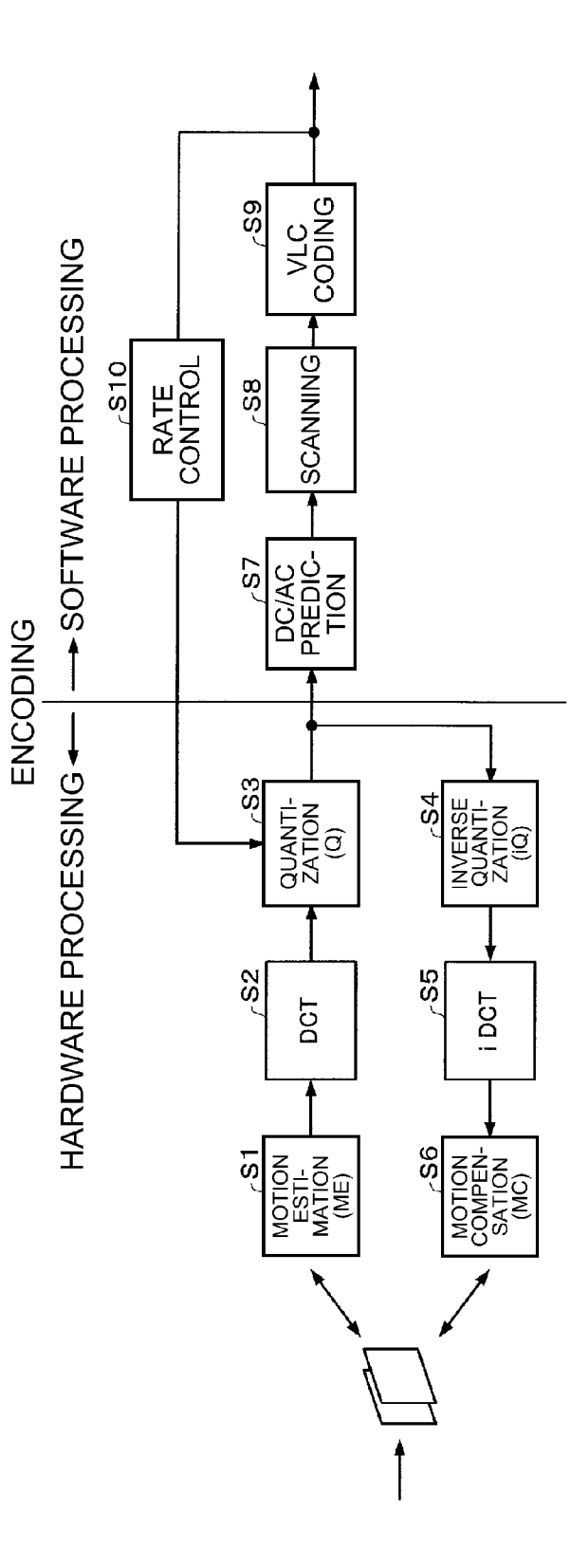
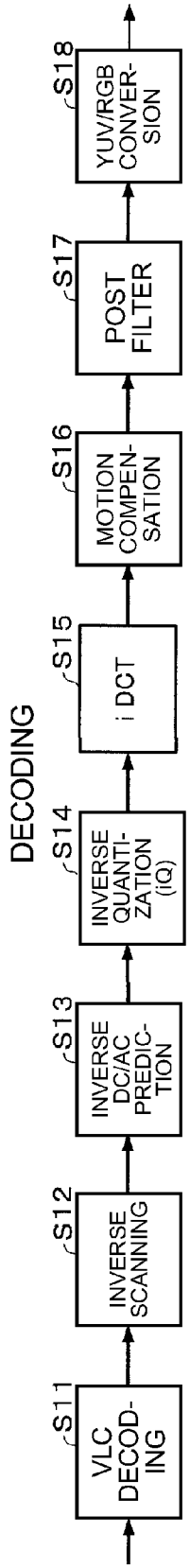
FIG. 1A
FIG. 1B

DCT COEFFICIENT

HIGH-FREQUENCY →

HIGH-FREQUENCY ↓

| 224 | 130 | 40  | 16  | 11 | 8  | -2 | -1 |
|-----|-----|-----|-----|----|----|----|----|
| 41  | -34 | -14 | -10 | -4 | 0  | -1 | 3  |
| -7  | 10  | -12 | 2   | 2  | -5 | 1  | -1 |
| 22  | -7  | 9   | 2   | 0  | 0  | -3 | 2  |
| -8  | 4   | -6  | 3   | -1 | -2 | 4  | -1 |
| 5   | 2   | -1  | -4  | 0  | 1  | -1 | -1 |
| 4   | -5  | 3   | -1  | 0  | 2  | 0  | -1 |
| -5  | 5   | -2  | 3   | 0  | -2 | 1  | -1 |

FIG. 3

QUANTIZATION TABLE

| 8  | 6  | 5  | 8  | 12 | 20 | 26 | 30 |
|----|----|----|----|----|----|----|----|
| 6  | 6  | 7  | 10 | 13 | 29 | 30 | 28 |
| 7  | 7  | 8  | 12 | 20 | 29 | 35 | 28 |
| 7  | 9  | 11 | 15 | 26 | 44 | 40 | 31 |
| 9  | 11 | 19 | 28 | 34 | 55 | 52 | 39 |
| 12 | 18 | 28 | 32 | 41 | 52 | 57 | 46 |
| 25 | 32 | 39 | 44 | 52 | 61 | 60 | 51 |
| 36 | 46 | 48 | 49 | 56 | 50 | 52 | 50 |

FIG. 4

QUANTIZED DCT COEFFICIENT

| 28 | 22 | 8  | 2  | 1 | 0 | 0 | 0 |
|----|----|----|----|---|---|---|---|
| 7  | -6 | -2 | -1 | 0 | 0 | 0 | 0 |
| -1 | 1  | -2 | 0  | 0 | 0 | 0 | 0 |
| 3  | -1 | 1  | 0  | 0 | 0 | 0 | 0 |
| -1 | 0  | 0  | 0  | 0 | 0 | 0 | 0 |
| 0  | 0  | 0  | 0  | 0 | 0 | 0 | 0 |
| 0  | 0  | 0  | 0  | 0 | 0 | 0 | 0 |
| 0  | 0  | 0  | 0  | 0 | 0 | 0 | 0 |

FIG. 5

$$R = X_1 Ec \frac{1}{Qc} + X_2 Ec \frac{1}{Qc^2}$$

$$Ec = \begin{cases} \sum \frac{|x'_{ij}|}{A} & \begin{pmatrix} \text{INTER-FRAME CODING} \\ \text{MACRO-BLOCK} \end{pmatrix} \\ \sum \frac{|x_{ij} - \mu|}{A} & \begin{pmatrix} \text{INTRA-FRAME CODING} \\ \text{MACRO-BLOCK} \end{pmatrix} \end{cases}$$

$$\left( \text{WHERE } \mu = \sum \frac{|x_{ij}|}{A} \right)$$

FIG. 6

| PARAMETER | DESIGNATION |
|---|---|
| Rs | BIT RATE |
| Rc | NUMBER OF BITS USED TO ENCODE THE PRESENT FRAME |
| Rp | AVERAGE BIT NUMBER THAT IS GENERATED IN ONE FRAME |
| Ec | AVERAGE ABSOLUTE VALUE OF DATA IN THE PRESENT FRAME |
| Qc | QUANTIZATION PARAMETER IN THE PRESENT FRAME |
| Qp | QUANTIZATION PARAMETER IN THE PREVIOUS FRAME |
| Nr | NUMBER OF REMAINING ENCODING FRAMES |
| Rr | NUMBER OF REMAINING USEABLE BITS |
| T | NUMBER OF BITS ALLOCATED TO THE PRESENT FRAME |
| S | NUMBER OF BITS USED IN THE PREVIOUS FRAME |
| Hp | NUMBER OF BITS FOR OTHER THAN INFORMATION SUCH AS HEADER AND MOTION VECTOR IN THE PREVIOUS FRAME |
| Bs | NUMBER OF BITS IN FIFO BUFFER PART |
| B | CURRENT NUMBER OF OCCUPIED BITS IN FIFO BUFFER PART |

FIG. 15

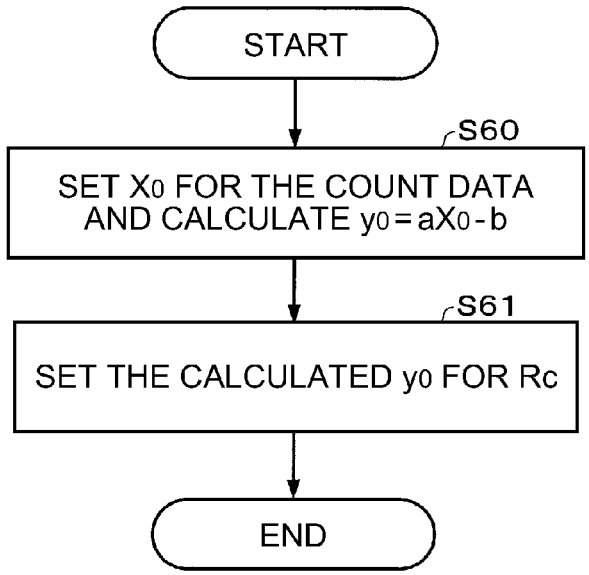

FIG. 16

IMAGE DATA COMPRESSION DEVICE, ENCODER, ELECTRONIC EQUIPMENT AND METHOD OF COMPRESSING IMAGE DATA

RELATED APPLICATIONS

This application is a continuation of U.S. patent application Ser. No. 11/124,806 filed on May 9, 2005. This application claims the benefit of Japanese Patent Application No. 2004-139754 filed May 10, 2004. The disclosures of the above applications are incorporated herein by reference.

BACKGROUND

1. Technical Field

The present invention relates to an image data compression device, an encoder, electronic equipment and a method of compressing image data.

2. Related Art

As a general-purpose encoding method for multimedia data such as a static or motion image data and an audio data, Moving Picture Experts Group Phase 4 (MPEG-4) is standardized. Recent mobile devices can encode and decode image data in conformity to this MPEG-4 standard, and they can play a video and send and receive data through networks.

In the MPEG-4 standard, a compressed motion image data, which is made by encoding the image data, should be produced at a regular rate. However, compression efficiency widely fluctuates based on a content of the image data when the motion image data is compressed. MPEG-4 Visual Part (recommendation report ISO/IEC 14496-2: 1999(E) Annex L) discloses a rate control method with which the compressed data is produced at the regular rate by controlling an amount of generated codes in order to keep the fluctuation to a certain level.

When the encoding (compressing) process of the MPEG-4 is conducted, all the process may be carried out by hardware. However, in this case, a large circuit is required and it is difficult to make the size smaller when it is integrated as IC (integrated circuit or semiconductor device). Especially, when it is used in the mobile devices such as a cellular phone, it can not meet a request for downsizing of the device.

On the other hand, all the process of the encoding may also be carried out by software. However, in this case, a load of a Central Processing Unit (CPU) which processes the software will be increased. Therefore, a time which the CPU can spend for processing other things will be limited and a performance of equipment in which the CPU is mounted will be lowered. In addition, a processing time of the CPU will get longer and a large amount of power will be consumed. Especially, when it is used in the mobile devices such as the cellular phone, it can not meet a request for reducing the power consumption in order to curtail the draining of a battery.

Given these factors, all the process of the encoding may be carried out by the hardware and the software. However, after consideration, it turned out that the rate control method disclosed in MPEG-4 Visual Part (recommendation report ISO/IEC 14496-2: 1999(E) Annex L) cannot be carried out when allocation of the hardware and the software is optimized. In other words, when the process is allocated between the hardware process and the software process which have different processing speeds, a buffer is needed in order to absorb a difference of the processing speed. But when the buffer is provided, the above-mentioned rate control method cannot be carried out. This means that it is difficult to satisfy both of the allocating optimization of the hardware and the software and the production of the compressed data at the regular rate in the compression process of the image data.

Moreover, even if the production rate of the compressed data can be controlled, a block-noise often appears in the image formed of the expanded data with the rate control method described in MPEG-4 Visual Part (recommendation report ISO/IEC 14496-2: 1999(E) Annex L). Therefore, there is still a problem that an image quality could be deteriorated.

Furthermore, when the amount of the compressed data is increased in order to prevent the image quality from being deteriorated, a desired rate at which the data is sent cannot be maintained.

The present invention has been developed in consideration of the above-mentioned problems, and intended to provide an image data compression device which can steadily generate a compressed data at a regular rate while optimizing allocation of an image data compression process to hardware and software and preventing the image quality from being deteriorated at the same time. The present invention also is intended to provide an encoder, electronic equipment and a method of compressing image data.

SUMMARY

In order to solve the above-mentioned problems, an image data compression device to compress image data of first aspect of the present invention includes a quantization part quantizing the image data with a quantization step that varies based on a quantization parameter, a FIFO buffer part buffering quantized data of a plurality of frames which are quantized by the quantization part, a coded data formation part reading out the quantized data from the FIFO buffer part asynchronously with a writing to the FIFO buffer part and generating coded data by encoding the quantized data, a rate control part controlling a data size of the coded data by changing the quantization step of the quantization part by frames, calculating a predicted data size of the coded data of a previous frame from a data size of the quantized data of the previous frame and calculating the quantization parameter by using the predicted data size and a frame skip part performing a skip process to skip a generation process of the image data that is supplied to the quantization part and performing the skip process if a frame, in which the quantization parameter becomes larger than a skip threshold, appears consecutively in a number of times which is equal or more than the number of a skip succession threshold.

In the first aspect of the present invention, the FIFO buffer part is provided between the quantization part and the coded data formation part. In this way, a process of the quantization part and a process of the coded data formation part can be executed asynchronously and in parallel. When a generation rate of the coded data generated by the coded data formation part is controlled, the rate control part calculates a predicted data size of the coded data generated by the coded data formation part from a data size of the quantized data written in the FIFO buffer part and the quantization step of the quantization part is changed based on the predicted data size.

In this way, even if it is not possible to conduct the rate control method described in MPEG-4 Visual Part (recommendation report ISO/IEC 14496-2: 1999(E) Annex L), the generation rate of the coded data can be controlled and the coded data which is compressed image data can be generated at a regular rate because the process of the quantization part and the process of the coded data formation part are executed asynchronously.

Furthermore, the frame skip part is provided and the skip process is performed if a frame, in which the quantization parameter becomes larger than a skip threshold, appears consecutively in a number of times which is equal or more than the number of a skip succession threshold. Therefore, even in a case that a size of the coded data of some images (especially, artificial images) increases and a bit rate cannot be securely maintained even though the above-mentioned rate control is conducted, the increase in the coded data generated by frame can be adequately controlled and the bit rate can be securely maintained.

An image data compression device to compress image data of second aspect of the present invention includes a quantization part quantizing the image data with a quantization step that varies based on a quantization parameter, a FIFO buffer part buffering quantized data of a plurality of frames which are quantized by the quantization part, a coded data formation part reading out the quantized data from the FIFO buffer part asynchronously with a writing to the FIFO buffer part and generating coded data by encoding the quantized data, a rate control part controlling a data size of the coded data by changing the quantization step of the quantization part by frames, calculating a predicted data size of the coded data of a previous frame from a data size of the quantized data of the previous frame and calculating the quantization parameter by using the predicted data size and a frame skip part performing a skip process to skip a generation process of the image data supplied to the quantization part and performing the skip process if a complexity, which corresponds to a difference value between the image data that is quantized by the quantization part and the image data of the previous frame, is equal or more than a complexity threshold.

In the second aspect of the present invention, the FIFO buffer part is provided between the quantization part and the coded data formation part. In this way, a process of the quantization part and a process of the coded data formation part can be executed asynchronously and in parallel. When a generation rate of the coded data generated by the coded data formation part is controlled, the rate control part calculates a predicted data size of the coded data generated by the coded data formation part from a data size of the quantized data written in the FIFO buffer part and the quantization step of the quantization part is changed based on the predicted data size.

In this way, even if it is not possible to conduct the rate control method described in MPEG-4 Visual Part (recommendation report ISO/IEC 14496-2: 1999(E) Annex L), the generation rate of the coded data can be controlled and the coded data which is compressed image data can be generated at a regular rate because the process of the quantization part and the process of the coded data formation part are executed asynchronously.

The frame skip part is provided and the skip process is performed if a complexity, which is calculated at the time of motion estimation or used to calculate the quantization parameter, is a complexity threshold. Therefore, even in the case that a size of the coded data of some images (especially, artificial images) increases and the bit rate cannot be securely maintained even though the above-mentioned rate control is conducted, the increase in the coded data that are generated by frame can be adequately controlled and the bit rate can be securely maintained.

In the image data compression device, the rate control part may calculate the quantization parameter such that a value of the quantization parameter is assignable and equal or smaller than an upper limit of the quantization parameter by using the predicted data size.

In this way, a size of the quantized data can get smaller and the size of the coded data also becomes smaller to an extent in which an image quality is not deteriorated because the quantization parameter is obtained such that a value of the quantization parameter is equal or smaller than an upper limit of the quantization parameter. In addition, a regular bit rate can be maintained since the skip process can be performed as described above.

In the image data compression device, the rate control part may calculate the quantization parameter such that a value of the quantization parameter is assignable, equal or smaller than the upper limit of the quantization parameter and is equal or larger than a lower limit of the quantization parameter.

The rate control part calculates the quantization parameter such that a value of the quantization parameter is equal or smaller than the upper limit of the quantization parameter. Generally, when the value of the quantization parameter becomes larger, the image data become coarser and then the size of the quantized data can get smaller and the size of the coded data also becomes smaller. On the other hand, block-noise appears more clearly in the image that is constructed by decoding the coded data. Therefore, with the above-described feature, it is possible to avoid a case that the block-noise appears in the image constructed by decoding the compressed data after the encoding even though the above-mentioned rate control is conducted.

Furthermore, the rate control part calculates the quantization parameter such that a value of the quantization parameter is equal or larger than a lower limit of the quantization parameter. Generally, when the value of the quantization parameter becomes smaller, the image data become denser and then the size of the quantized data can get larger. On the other hand, more less block-noise appears in the image that is constructed by decoding the coded data. Therefore, even when the rate control is performed in the above-described way, the data size will not become large more than necessary.

In these ways, the rate control that optimizes the compression efficiency and the quality of the image can be easily realized.

The image data compression device may further include a count register in which a count data that corresponds to an access number of the FIFO buffer part is stored and the rate control part may calculate the predicted data size from the count data.

In this way, the image data compression device that can realize the rate control method described in MPEG-4 Visual Part (recommendation report ISO/IEC 14496-2: 1999(E) Annex L) with a simpler configuration can be provided because information equivalent to the data size of the quantized data can be obtained with a simple configuration.

In the image data compression device, the predicted data size may be a data size obtained by linearly transforming the data size of the quantized data of the previous frame.

In the image data compression device, a coefficient corresponding to an encoding efficiency of the coded data formation part may be used to linearly transform the data size of the quantized data of the previous frame.

Moreover, in the image data compression device, the liner transformation may be a transformation to correct for a header size that is added to the coded data.

Focusing attention on the fact that a relationship between the data size of the quantized data and the data size of the coded data is approximately linear, the predicted data size can be derived from a liner transformation formula which expresses this linear relationship. Therefore, the accurate rate control can be realized without increasing a processing load.

The image data compression device may further include a quantization table memorizing a quantization step value and the rate control part may change the quantization step by conducting the quantization by using the product of the quantization parameter and the quantization step value.

The image data compression device may further include a discrete cosine transformation part supplying the image data to which a discrete cosine transformation is performed to the quantization part by frames.

Furthermore, the image data compression device may include a hardware processing unit processing image data of a motion image by hardware and including the quantization part and the FIFO buffer part and a software processing unit generating the coded data by encoding the quantized data read out from the FIFO buffer part by software and including the coded data formation part, the rate control part and the frame skip part.

Here, zero data predominantly exist in a quantized motion image data and there are not many types of the information of the data compared with the data before quantized. Furthermore, a load of a calculation for the quantizing is generally small. Therefore, the process load is small even when such process with the small information and the small calculation load is processed by the software. On the other hand, most of the quantization processes have large information volume and their calculation processes are complex. Therefore, the load which is imposed to perform such processes is too heavy for the software. Though the load of the quantization process is heavy, there is not much need for modification in a case that standards are set. Furthermore, these processes are appropriate for the hardware because many repeated processes exist. Moreover, an amount of data that are transmitted from the hardware processing unit to the software processing unit become small because the amount of data after the quantization in the hardware processing unit is small. Therefore, the burden imposed on data transmission control can be lightened. In addition, a software process and a hardware process can be executed in parallel because the FIFO buffer part is provided between the software processing unit and the hardware processing unit. Moreover, both the downsizing of the device and the reduction of the power consumption can be achieved by adequately using both of the software process and the hardware process according to circumstances.

In the image data compression device, the hardware processing unit may output a difference value between an input image data of a present frame and an old image data of the previous frame as a motion vector information, performs the discrete cosine transformation to the motion vector information and output the transformed information as the image data to the quantization part, and may generate the old image data based on an inversely quantized data obtained by inversely quantizing the quantized data with the quantization step.

In the image data compression device, the software processing unit may convert the quantized data that is read out from the FIFO buffer part into a variable length code.

In the image data compression device, the software processing unit may perform a scan process in which the quantized data read out from the FIFO buffer part are rearranged and converts a result of the scan process into the variable length code.

In the image data compression device, the software processing unit may calculate a AC component and a DC component from the quantized data that is read out from the FIFO buffer part, perform a scan process in which the AC component and the DC component are rearranged and convert a result of the scan process into the variable length code.

An encoder to perform a compression process to image data of first aspect of the present invention includes an image input interface performing a first interface process to input the image data, a quantization part quantizing the image data with a quantization step that varies based on a quantization parameter, a FIFO buffer part buffering quantized data of a plurality of frames which are quantized by the quantization part, a host reading out the quantized data from the FIFO buffer part asynchronously with a writing to the FIFO buffer part, calculating a predicted data size of a previous frame from a data size of the quantized data of the previous frame and calculating the quantization parameter by using the predicted data size, a host interface performing a second interface process with the host and a skip flag register skipping a generation process of the image data and being set if a frame, in which the quantization parameter becomes larger than a skip threshold, appears consecutively in a number of times which is equal or more than the number of a skip succession threshold, wherein the generation process of the image data of a present frame is skipped if the skip flag register is set.

An encoder to perform a compression process to image data of second aspect of the present invention includes an image input interface performing a first interface process to input the image data, a quantization part quantizing the image data with a quantization step that varies based on a quantization parameter, a FIFO buffer part buffering quantized data of a plurality of frames which are quantized by the quantization part, a host reading out the quantized data from the FIFO buffer part asynchronously with a writing to the FIFO buffer part, calculating a predicted data size of a previous frame from a data size of the quantized data of the previous frame and calculating the quantization parameter by using the predicted data size, a host interface performing a second interface process with the host and a skip flag register skipping a generation process of the image data and being set if a difference value information between the image data quantized by the quantization part and the image data of the previous frame is equal or more than a complexity threshold, wherein the generation process of the image data of a present frame is skipped if the skip flag register is set.

In this way, for example, an encoding process to encode image data of a motion image from an imaging unit can be allocated to an encoder and a host. Therefore, quantization of the above-mentioned encoding process and the coded data generation can be executed in parallel. Moreover, both the downsizing of the device in which the encoder is mounted and the reduction of the power consumption can be achieved by adequately using both of the encoder and the host according to circumstances.

Electronic equipment of first aspect of the present invention includes the image data compression devices described above.

Electronic equipment of second aspect of the present invention includes the encoder described above.

In this way, electronic equipment which can optimize the allocation of the compression process of the image data to the hardware and the software without deteriorating the display quality can be provided. Furthermore, the electronic equipment can securely generate the compressed data at the regular rate.

A method of compressing image data of first aspect of the present invention includes a step of quantizing the image data by frames, a step of calculating a predicted data size of coded data of a previous frame from a data size of a quantized data of the previous frame, a step of calculating a quantization parameter by using the predicted data size, a step of changing a data size of coded image data by quantizing the image data of a present frame with the quantization step that varies based on a quantization parameter and a step of skipping a generation process of the image data if a frame, in which the quantization parameter becomes larger than a skip threshold, appears consecutively in a number of times which is equal or more than the number of a skip succession threshold.

A method of compressing image data of second aspect of the present invention includes a step of quantizing the image data by frames, a step of calculating a predicted data size of coded data of a previous frame from a data size of a quantized data of the previous frame, a step of calculating a quantization parameter by using the predicted data size, a step of changing a data size of a coded image data by quantizing the image data of a present frame with a quantization step that varies based on a quantization parameter and a step of skipping a generation process of the image data if a complexity, which corresponds to a difference value between the image data quantized by the quantization part and an image data of the previous frame, is equal or more than a complexity threshold.

BRIEF DESCRIPTION OF THE DRAWINGS

FIGS. 1A and 1B are explanatory drawings for describing an encoding process and a decoding process of MPEG-4.

FIG. 3 is an explanatory drawing of an example of DTC coefficient.

FIG. 4 is an explanatory drawing of an example of a quantization table.

FIG. 5 is an explanatory drawing of an example of a quantized DCT coefficient.

FIG. 6 is an explanatory drawing of a modeled formula used in a rate control method.

FIG. 15 is an explanatory diagram of parameters used in the calculation process of the quantization parameter.

FIG. 16 is a flow diagram of an example of a calculation process to obtain a value of the number of bits used in encoding.

FIG. 34 is applied.

DETAILED DESCRIPTION

Embodiments of the present invention will now be described in detail with reference to the accompanying drawings. Embodiments described below shall not limit the invention which is described in claims. Also, all the components described in the embodiments below are not necessarily essential to the present invention.

1. MPEG-4

Firstly, a brief description of an encoding process of MPEG-4 will be given. A decoding process to expand compressed data that are coded in the encoding process will also be described below.

FIGS. 1A and 1B are explanatory drawings for describing an encoding process and a decoding process of MPEG-4. Details of these processes are described in, for example, a book "JPEG&MPEG, illustrated image compression technology" written by Hiroshi Ochi and Hideo Kuroda (Publisher: Nippon Jitsugyo Publishing Co., Ltd.). Therefore, mainly the processes that relate to the present invention will be described here.

In the encoding process shown in FIG. 1A, firstly, motion estimation (ME) between two consecutive images (two frames) is carried out (Step 1 or S1). To be more specific, a difference of the two images in the same pixel is estimated. The difference in an unchanged image area between the two images becomes zero and an information volume can be lessened. Data after the motion estimation will be a difference (plus or minus components) in a changed image area between the two images and the zero data in the unchanged image area.

Figure 2:
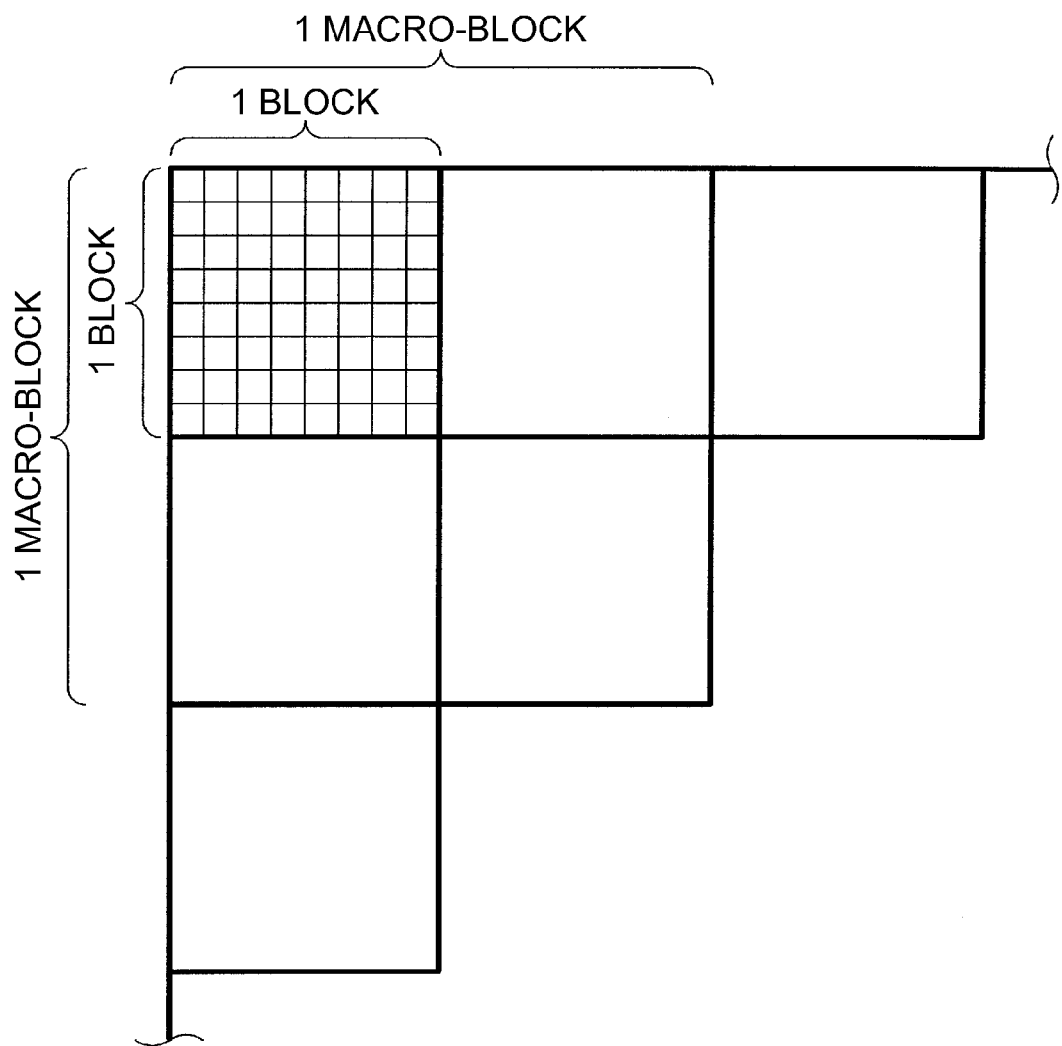
FIG. 2 is an explanatory drawing of a macro-block.

Next, a discrete cosine transformation (DCT) is performed (Step 2 or S2). The DTC is conducted in a block of 8 pixels×8 pixels as shown in FIG. 2 and a DTC coefficient is calculated with respect to each block. The DTC coefficient after the discrete cosine transformation expresses a gray scale change in the block by brightness of the whole block (DC component) and a spatial frequency (AC component). FIG. 3 shows an example of the DTC coefficient in the block of 8 pixels×8 pixels (quotation from FIG. 5-6, page 116 of the above-mentioned book). The figure of the DTC coefficient on the upper-left corner is the DC component and the rest of the figures of the DTC coefficient are the AC components. Even when the high-frequency components in the AC components are omitted, it has a small impact on image recognition.

Next, quantization of the DCT coefficient is performed (Step 3 or S3). In the quantization, each DCT coefficient in the block is divided by the corresponding quantization step value in a quantization table in order to decrease the information volume. As an illustration, the DCT coefficient shown in FIG. 3 is quantized by using the quantization table shown in FIG. 4 and the result of the quantized DCT coefficient is shown in FIG. 5 (quotation from FIG. 5-9 and FIG. 5-10, page 117 of the above-mentioned book). As shown in FIG. 5, when the DCT coefficients of the high-frequency components are divided by the quantization step value and the result is rounded off to the nearest whole number, most of the elements of the coefficients become zero data and the information volume is significantly decreased.

Such encoding process requires a feedback route in order to conduct the above-mentioned motion estimation (ME) between the present frame and the next consecutive frame. In this feedback route, an inverse quantization (iQ), an inverse DCT and motion compensation (MC) are performed (Step 4-6 or S4-S6) as shown in FIG. 1A. Though detailed operation of the motion compensation will be omitted here, this process is carried out by the macro-block which is 16 pixels× 16 pixels as shown in FIG. 2.

In this embodiment, the above-described Steps 1 through 6 are conducted by the hardware.

Both DC/AC (direct current/alternating current component) prediction process performed in Step 7 and a scan process conducted in Step 8 shown in FIG. 1A are necessary in order to enhance the efficiency of conversion into a Variable Length Code (VLC) conducted in Step 9 or S9. This is because the difference of the DC components between the two consecutive blocks is encoded in order to code into the VLC in Step 9. As for the AC components, order of the coding has to be decided by scanning the block (also called as zigzag scan) from the lower frequency to the higher frequency.

The variable length coding in Step 9 is also called as an entropy coding. According to the entropy coding, fewer codes are given to a component which appears more frequently. Here, Huffman coding is adopted as the entropy coding.

Then, the difference of the DC components between the two consecutive blocks is encoded by using the result of Step 7 and Step 8. As for the AC components, the DCT coefficient value is encoded in the above-mentioned scanning order from the lower frequency to the higher frequency by using the result of Step 7 and Step 8.

Information production of the image data fluctuates according to intricateness of the image or intensity of the image motion. In order to absorb the fluctuation and transmit the data at a constant transmission rate, code generation has to be controlled. That is a rate control in Step 10. Generally, a buffer memory is provided for the rate control. An information volume accumulated in the buffer memory is monitored in order to prevent the buffer memory from overflowing. In this way, the information production is controlled. To be more specific, bit number indicating the DCT coefficient value is reduced by making a quantizing property in Step 3 coarse.

In this embodiment, the above-described Steps 7 though 10 are performed by the software. In other words, processes in Steps 7 though 10 are conducted by hardware in which the software is installed.

FIG. 1B shows a decoding process of the compressed image data by the encoding process shown in FIG. 1A. This decoding process is carried out by performing inverse processes of the coding process shown in FIG. 1A in a reverse order. A "post filter" in FIG. 1B is a filter to eliminate the block-noise. "YUV/RGB conversion" shown in FIG. 1B means that output of the post filter is converted from a YUV format to a RGB format.

2. Rate Control

In respect to the rate control that is carried out in Step 10 shown in FIG. 1A, a method disclosed in MPEG-4 Visual Part (recommendation report ISO/IEC 14496-2: 1999(E) Annex L) will be briefly described. In this method, a quantization parameter at the time of the encoding is changed. The quantization step of the quantization (Step 3) shown in FIG. 1A is varied by changing the quantization parameter. In this way, the quantizing property is changed and an amount of the generated code (data size) is controlled.

In the method, a quantization parameter Qc is set up in each frame and a code production "R" which is produced when one frame is encoded is controlled. At this time, the quantization parameter Qc is calculated through the model formula shown in FIG. 6.

In FIG. 6, R designates an amount of codes that are produced when a one frame is encoded. Qc designates the quantization parameter, Ec denotes complexity of the frame and, $X_1$ and $X_2$ designate parameters of this model. As the complexity of the frame Ec, an average of the absolute value of the pixel which is encoded is used. As for an inter-frame coding macro-block, the complexity of the frame Ec is calculated by dividing summation of absolute difference value $X'_{ij}$ between the present frame and the previous frame by an area A. It is calculated after the motion estimation. As for an intra-frame coding macro-block, it is calculated by dividing summation of absolute difference value ($|X'_{ij}-\mu|$) between the present frame and a reference value μ by the area A. The reference value μ can be a mean value of all the pixels within the macro-block.

As described above, the code production is modeled by the quadratic expression of the reciprocal fraction of the quantization parameter and the complexity of the frame as shown in FIG. 6.

Figure 7:
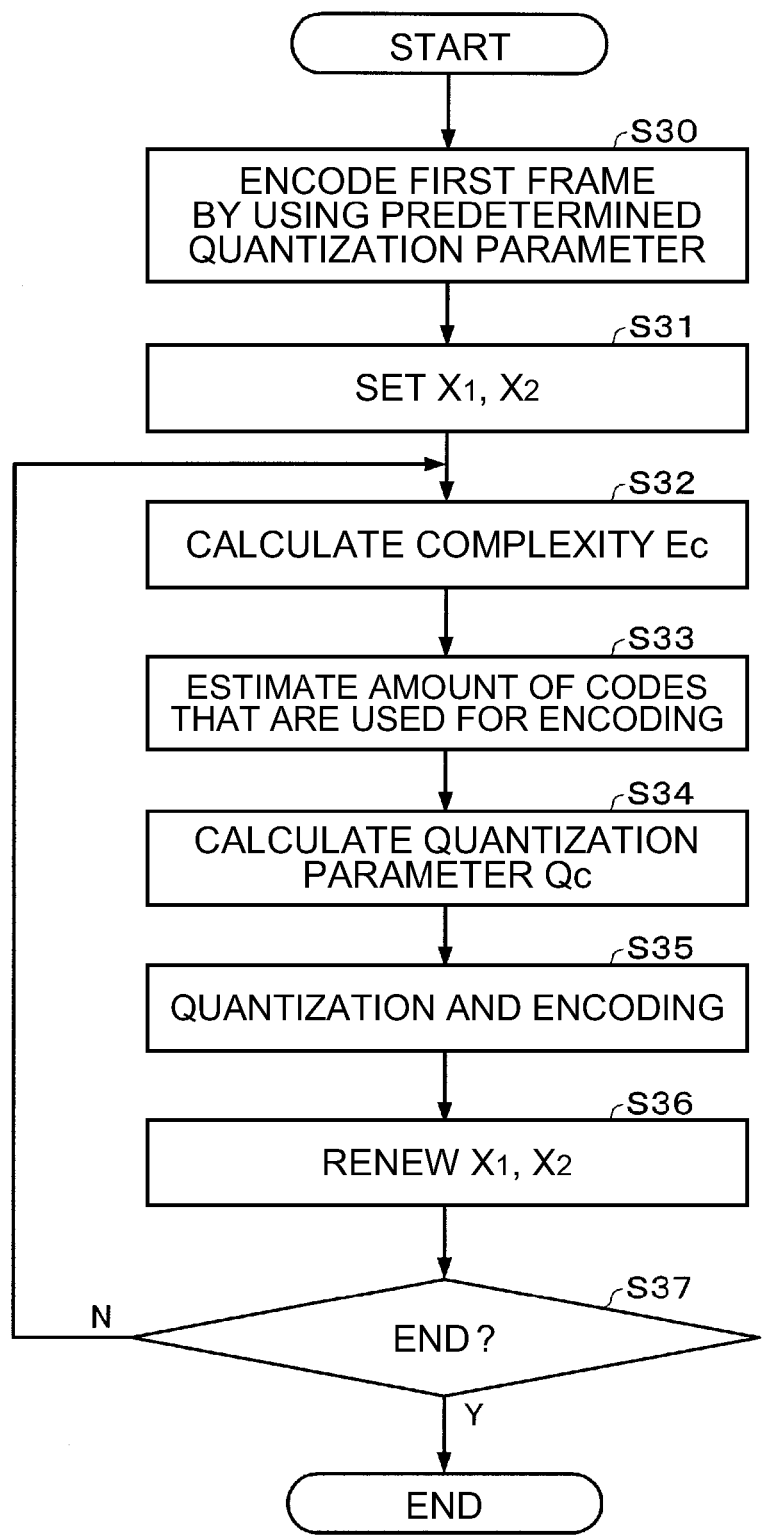
FIG. 7 is a flow diagram of an example of a process of the rate control in which the modeled formula shown in FIG. 6 is used.

FIG. 7 shows an example of a process flowchart of the rate control in which the modeled formula shown in FIG. 6 is used.

Firstly, a first frame is encoded by using a predetermined quantization parameter (Step 30 or S30). Secondly, default values for model parameters $X_1$ and $X_2$ are set (Step 31 or S31). Thirdly, the complexity Ec of the present frame is calculated (Step 32 or S32). The complexity Ec can be calculated from the formula shown in FIG. 6. Then, an amount of codes that are used for encoding is estimated based on an amount of remaining useable codes and an amount of codes that are used in the previous frame (Step 33 or S33).

Furthermore, the model parameters $X_1$ and $X_2$ set in Step 31 and the complexity Ec calculated in Step 32 are assigned to the modeled formula shown in FIG. 6. The amount of codes R that are produced when a one frame is encoded is calculated by subtracting bits for other than information such as header and motion vector from bits that are used in the previous frame. The code production R calculated in this way is also set in the modeled formula shown in FIG. 6. Then, the quantization parameter Qc is calculated by solving the quadratic equation with the parameter Qc shown in FIG. 6 (Step 34 or S34).

Next, the frame is quantized and encoded by using the quantization parameter Qc calculated in Step 34 (Step 35 or S35). The model parameters $X_1$ and $X_2$ are renewed by solving the modeled formula shown in FIG. 6 based on the quantization parameter and the code production and the like of the previous frame (Step 36 or S36).

When this process flow is ended because of the predetermined condition (Step 37: Y), a string of the processes is ended (END). When the process flow is not ended (Step 38: N), return to Step 32. The above-mentioned processes are performed in each frame.

As described above, the rate control method described in MPEG-4 Visual Part (recommendation report ISO/IEC 14496-2: 1999(E) Annex L), the result of the previous frame encoding has to be reflected on the next frame encoding.

3. Image Data Compression Device

The present embodiment provides an image data compression device which can allocate the above-described string of encoding processes to hardware and software as well as optimize the allocation.

Figure 8:
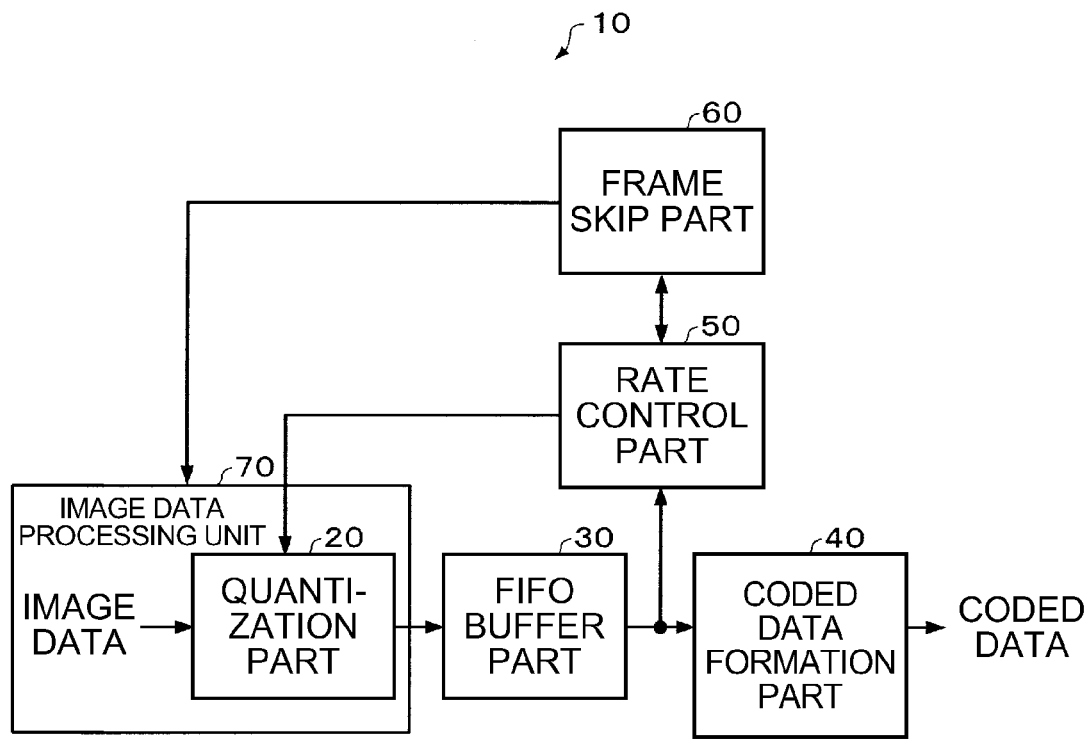
FIG. 8 is a block diagram schematically showing a structure of an image data compression device of the present embodiment.

FIG. 8 is a block diagram schematically showing a structure of the image data compression device according to the present embodiment.

An image data compression device 10 of the present embodiment has an image data processing unit 70 that includes a quantization part 20. The image data processing unit 70 conducts a process for compressing the image data that is input by frames. The quantization part 20 carries out Step 3 shown in FIG. 1A. The quantization part 20 quantizes image data by frames and with the quantization step that varies depending on the quantization parameter. The quantization parameter that is set in each frame is set in the quantization part 20. Here, the image data can be expressed by the DTC coefficient after the DTC process of Step 2 shown in FIG. 1A. In this case, the DTC coefficient shown in FIG. 3 is divided by the product of the quantization parameter and the quantization step value of the quantization table shown in FIG. 4, and then it is quantized as shown in FIG. 5.

The image data compression device 10 also includes a first in, first out (FIFO) buffer part 30. Quantized data of a number of frames that are quantized by the quantization part 20 are buffered in the FIFO buffer part 30. The quantized data that is output from the quantization part 20 by frames is sequentially written in the FIFO buffer part 30. The FIFO buffer part 30 works as a first-in and first-out memory circuit.

The image data compression device 10 further includes a coded data formation part 40. The coded data formation part 40 reads out a one frame worth of the quantized data from the FIFO buffer part 30 and generates the coded data by encoding the quantized data. The coded data formation part 40 reads the quantized data of the one frame from the FIFO buffer part 30 asynchronously with the writing to the FIFO buffer part 30.

Since the FIFO buffer part 30 is provided between the quantization part 20 (the image data processing unit 70) and the coded data formation part 40, it is possible to burden the hardware with the process of the quantization part 20 whose processing load is heavy and to burden the software with the coding process of the coded data formation part 40 whose processing load is light. Furthermore, both of the processes can be executed in parallel.

In the following description, a case in which the quantization part 20 (the image data processing unit 70) is made up of, for example, a fast hardware and the coded data formation part 40 is built up of, for example, a slow software will be described. However, the case is not limited to this. The present embodiment may also be applied to a case in which the coded data formation part 40 reads out the quantized data from the FIFO buffer part 30 asynchronously with the writing to the FIFO buffer part 30. Therefore, the quantization part 20 (the image data processing unit 70) may be made up of, for example, the fast hardware and the coded data formation part 40 may be built up of, for example, a slow hardware. As another form, the quantization part 20 (the image data processing unit 70) and the coded data formation part 40 may be made up of hardware that can read the software and these two parts may perform processes asynchronously.

The image data compression device 10 also includes a rate control part 50. The rate control part 50 finds a predicted data size by predicting a data size of the coded data in the previous frame from a data size of the quantized data in the previous frame. The rate control part 50 then varies the quantization step based on the predicted data size. It is obvious from FIG. 5 that the number of zero data in the quantized DCT coefficient increases when the quantization step is large. On the contrary, the number of zero data in the quantized DCT coefficient decreases when the quantization step is small. Such quantized data in which the number of zero data can be increased or decreased is written into the FIFO buffer part 30. Consequently, the quantized data read out from the FIFO buffer part 30 and the size of the coded data encoded by the coded data formation part 40 can be changed according to the quantization parameter.

As described above, the rate control method described in MPEG-4 Visual Part (recommendation report ISO/IEC 14496-2: 1999(E) Annex L), the result of encoding in the frame has to be reflected on the next frame encoding. However, when the quantization of quantization part 20 and the encoding of the coded data formation part 40 are allocated to the hardware and the software, they are processed asynchronously. Therefore, the quantized data which is read out from the FIFO buffer part 30 often becomes the data of the two frames older than the frame of the quantized data quantized by the quantization part 20. For this reason, the rate control method described in MPEG-4 Visual Part (recommendation report ISO/IEC 14496-2: 1999(E) Annex L), in which the result of encoding in the previous frame is reflected on the encoding of the frame, cannot be realized.

In order to solve this problem, in this embodiment, the rate control part 50 finds the predicted data size of the coded data in the previous frame as described above and the rate control part 50 controls the rate based on the predicted data size. In this embodiment, focusing attention on the following feature, the predicted data size is calculated.

Figure 9:
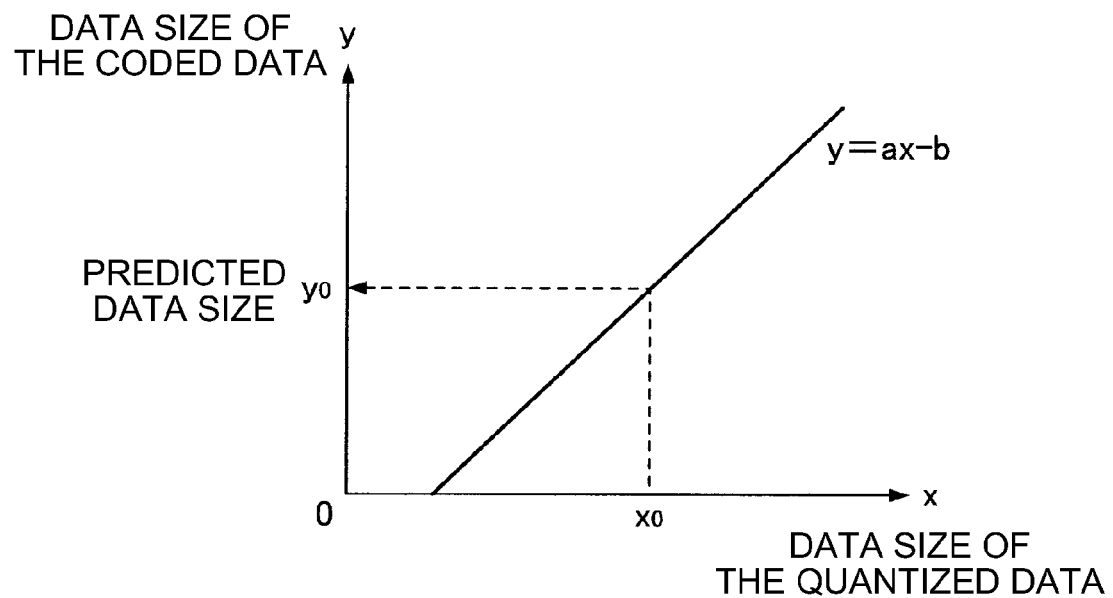
FIG. 9 is an explanatory drawing of a predicted data size.

FIG. 9 is an explanatory drawing showing a relationship between the data size of the quantized data and the data size of the coded data. Here, the quantized data is a data that is read out from the quantization part 20 and generated in Step 3 shown in FIG. 1A. The coded data is also a data that is produced in Step 9 in FIG. 1A by encoding the quantized data in the coded data formation part 40.

As show in FIG. 9, the relationship between the data size of the quantized data and the data size of the coded data is linear. In other words, when x is the data size of the quantized data and y is the data size of the coded data, y can be approximately obtained from the following formula (I) with the variable x.

$$y = ax - b \text{ (where } a \text{ and } b \text{ are positive real numbers)} \quad (1)$$

Therefore, a prediction value yo of the coded data size can be obtained by linearly transforming the data size of the quantized data xo. In the formula (I), "a" is a coefficient corresponding to an encoding efficiency of the coded data formation part 40. This coefficient is decided according to characteristics of the coded data formation part 40. More particularly, the coefficient can also be called as compressibility coefficient of Huffman encoding process for the Huffman encoding conducted in the coded data formation part 40.

In the formula (1), "b" is a value that corresponds to a data size of header information which is generated by the coded data formation part 40. For example, when the coded data is a stream data of MPEG-4, b is the data size of the header information of MPEG-4. Therefore, the liner transformation of the formula (1) can be considered as a transformation to correct for the header size which is added to the coded data.

The above-described coefficients "a" and "b" in the formula (1) are decided by statistically processing the relationship between the data size of the quantized data and the data size of the coded data.

The predicted data size obtained in the above-described way is reflected as the encoding result of the previous frame on the encoding of the present frame, and then the rate control method described in MPEG-4 Visual Part (recommendation report ISO/IEC 14496-2: 1999(E) Annex L) can be conducted. In this way, it is possible to realize both of the allocating optimization of the hardware and the software in the compression process of the image data and the more accurate rate control.

Though the predicted data size is calculated from the data size of the quantized data in FIG. 8, the case is not limited to this. The predicted data size can also be obtained from information equivalent to the data size of the quantized data.

In the following description, as the information equivalent to the data size of the quantized data, the number of accesses (writing frequency or reading frequency) to the FIFO buffer part 30 in each frame is used. When the writing to the FIFO buffer part 30 is conducted with a predetermined few bytes, the number of accesses in each frame can be equivalent to the data size of the quantized data. Furthermore, when the reading from the FIFO buffer part 30 is conducted with a predetermined few bytes, the number of accesses in each frame can be equivalent to the data size of the quantized data.

Figure 10:
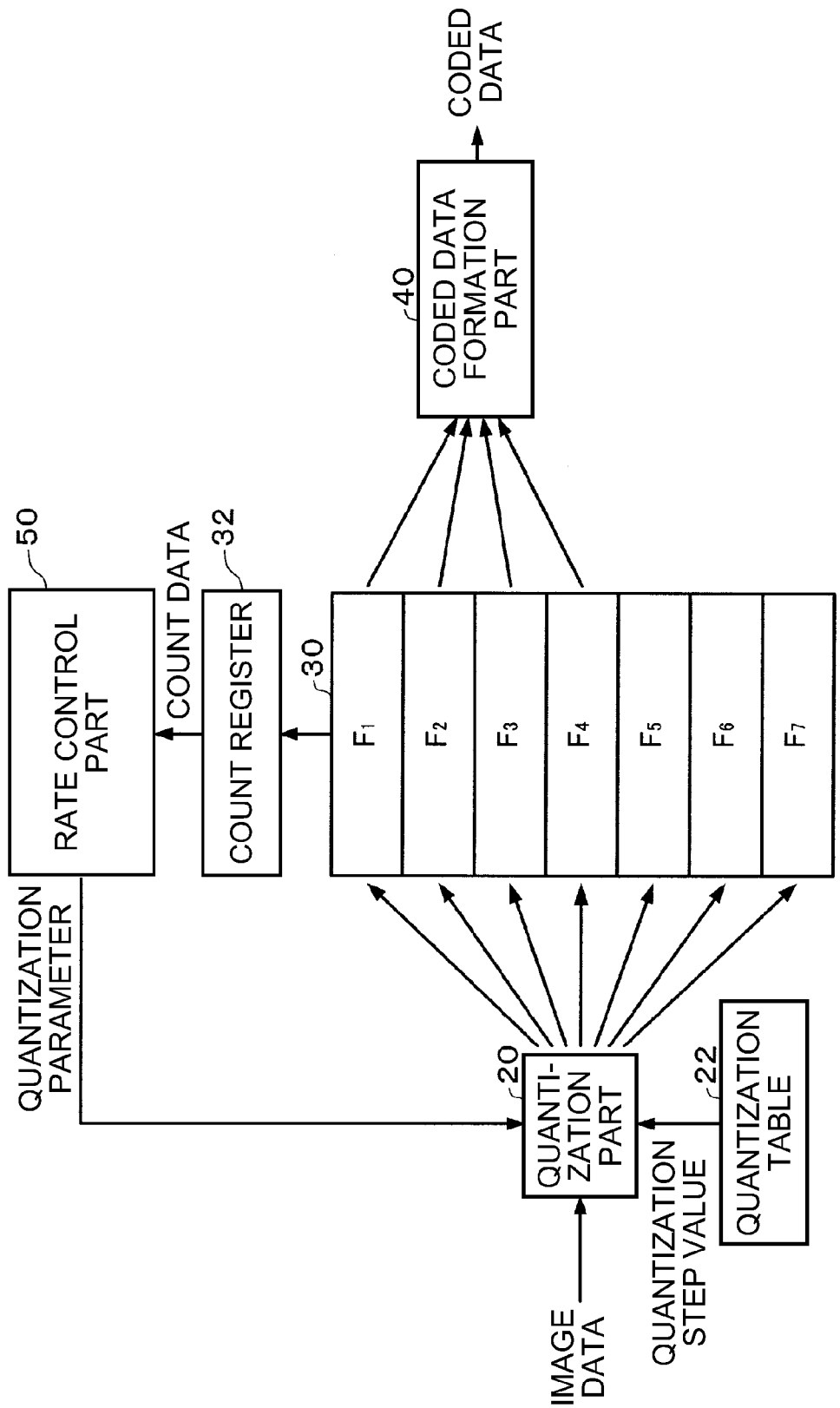
FIG. 10 is an explanatory drawing of the rate control method in the present embodiment.

FIG. 10 is an explanatory drawing of the rate control method in the present embodiment. The same structures as those of the image data compression device 10 shown in FIG. 8 are given the identical numerals and those explanations will be accordingly omitted. In FIG. 10, the FIFO buffer part 30 can store seven frames worth of the quantized data.

Figure 11:
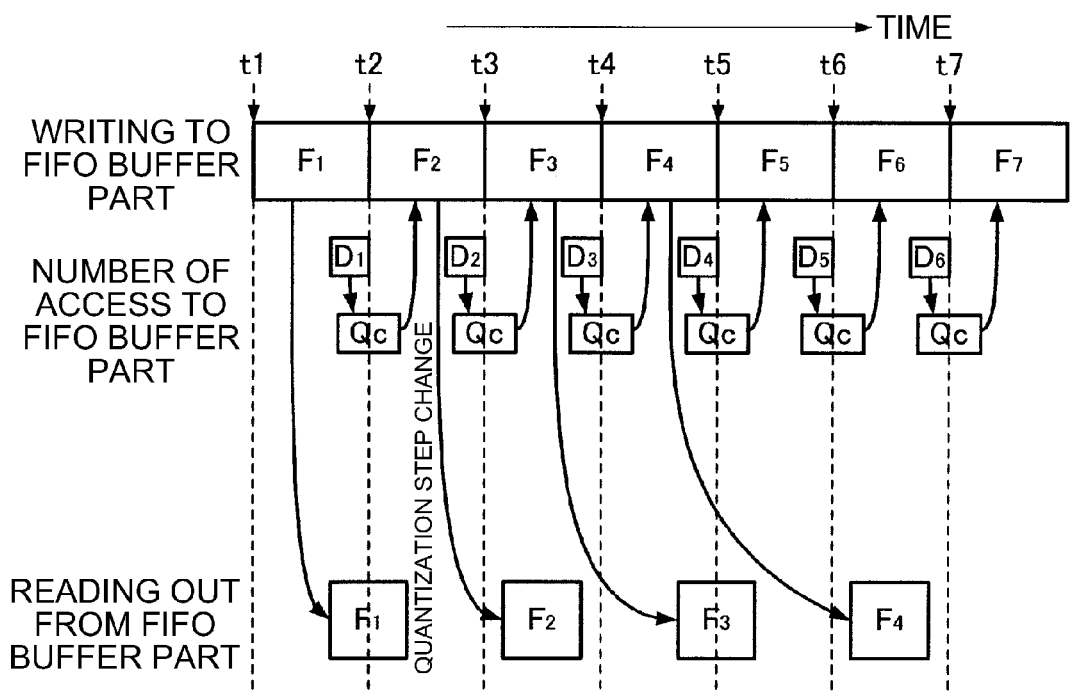
FIG. 11 is a view showing a frame format of operational timing of the rate control method shown in FIG. 10.

FIG. 11 is a view showing a frame format of operational timing of the rate control method shown in FIG. 10.

The quantization part 20 quantizes the image data by frames. For example, a quantization table 22 in which the quantization step value shown in FIG. 4 is set is provided. The quantization part 20 quantizes the image data by frames based on the quantization step value that is set in the quantization table 22 and the quantization parameter from the rate control part 50. More specifically, the quantization parameter is considered to be a coefficient of the quantization step value and the quantization step value is changed when the quantization part 20 conducts the quantization by using the product of the quantization parameter and the quantization step value.

The quantization part 20 quantizes the image data by frames at time t1, t2 ... and writes the quantized data into the FIFO buffer part 30 in order of the first frame $F_1$, the second frame $F_2$ .... A count data which a count register 32 holds in each frame is initialized in every frame. The count data is also incremented and renewed every time when the writing to the FIFO buffer part 30 is performed. Consequently, the count data that corresponds to the number of the writing to the FIFO buffer part 30 is set in the count register 32 when the writing of the quantized data in every frame is finished.

Meanwhile, the coded data formation part 40 reads the quantized data from the FIFO buffer part 30 by frame asynchronously with the writing of the quantized data to the FIFO buffer part 30 and carries out the coding process.

The rate control part 50 changes the quantization step value of the quantization part 20 based on the count data as of the time when the writing of the quantized data in each frame is finished. This is carried out separately from the processes of the coded data formation part 40. By doing this, the size of the quantized data quantized in the quantization part 20 is changed in the next frame to the frame in which the writing of the quantized data is finished. Accordingly, the size of the coded data generated by the coded data formation part 40 also changes.

In FIG. 11, the coded data formation part 40 sequentially reads out the quantized data in the first to fourth frames $F_1$-$F_4$ from the FIFO buffer part 30. The coded data formation part 40 then generates the coded data for each frame and outputs them.

A count data $D_1$ is stored on the count register 32 when the writing of the quantized data in the first frame $F_1$ to the FIFO buffer part 30 is finished. The count data $D_1$ is a data that corresponds to the writing frequency of the quantized data of the first frame $F_1$ to the FIFO buffer part 30. The count data $D_1$ can be related to the data size of the quantized data in the first frame $F_1$. This count data is initialized when the second frame $F_2$ starts and a count data $D_2$ is stored when the writing of the quantized data of the second frame $F_2$ to the FIFO buffer part 30 is finished. The count data $D_2$ is a data that corresponds to the writing frequency of the quantized data of the second frame $F_2$ to the FIFO buffer part 30.

The rate control part 50 reads out the count data each time when the writing to the FIFO buffer part 30 is finished and changes the quantization step value of the next frame. As shown in FIG. 11, after the writing of the quantized data in the first frame $F_1$ is completed, the rate control part 50 reads out the count data $D_1$ and calculates the predicted data size from the count data $D_1$. The rate control part 50 then estimates an amount of codes that is used for the encoding of the second frame $F_2$ based on the predicted data size and obtains the quantization parameter Qc as described in FIG. 6 and FIG. 7. Accordingly, the quantization part 20 quantizes the image data of the second frame $F_2$ by the product of the quantization parameter Qc and the quantization step value of the quantization table 22. This quantization parameter Qc is calculated based on the predicted data size of the coded data of the first frame $F_1$. The result of this quantization is written to the FIFO buffer part 30. In this way, the coded data can be generated at a desired rate because the predicted data of the previous frame is used in each frame.

In FIG. 8, the image data compression device 10 includes a frame skip part 60. The frame skip part 60 carries out a process to skip the image data production in the image data processing unit 70. In other words, the frame skip part 60 halts the generation process of the image data that is provided to the quantization part 20.

In this embodiment, when the data size of the coded data gets too large to maintain the regular bit rate as a result of the rate control by the rate control part 50, the frame skip part 60 carries out the skip process.

Therefore, the frame skip part 60 conducts the skip process when the frame in which the quantization parameter calculated in each frame becomes larger than a skip threshold, appears consecutively in a number of times which is equal or more than the number of a skip succession threshold. Alternatively, the frame skip part 60 conducts the skip process when the complexity exceeds a complexity threshold. The complexity corresponds to the difference value between the image data of the present frame which is quantized by the quantization part 20 and the image data of the previous frame. In this way, the frame skip part 60 can control the increase of the generated coded data in each frame and can maintain a regular bit rate.

Even when the rate control is conducted as described above, the block-noise could sometimes appear in an image that are constructed by decoding encoded and compressed data, though it depends on the image. This is because the image that are constructed by decoding (expanding) the compressed data often has block-noise even when the generation rate of the compressed data is controlled by the rate control method described in MPEG-4 Visual Part (recommendation report ISO/IEC 14496-2: 1999(E) Annex L), and a quality of the image is sometimes deteriorated.

Figure 12:
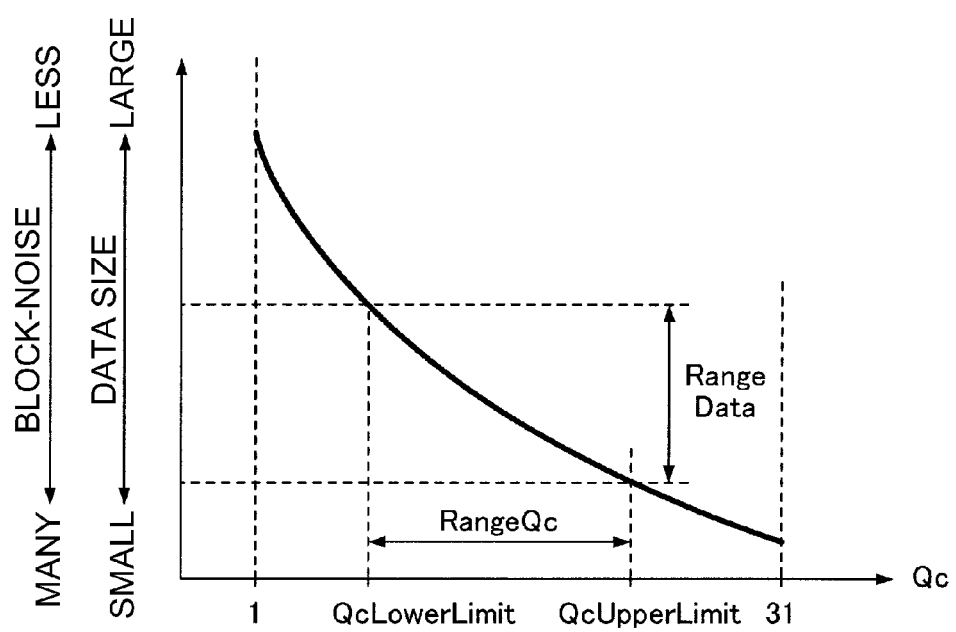
FIG. 12 schematically shows a relationship between a quantization parameter and a data size of coded data or block-noise.

FIG. 12 schematically shows a relationship between the quantization parameter and the data size of the coded data or the block-noise. In FIG. 12, the horizontal axis is a quantization parameter scale and the vertical axis is a data size scale and a block-noise scale. In the rate control method described in MPEG-4 Visual Part (recommendation report ISO/IEC 14496-2: 1999(E) Annex L), a range of the quantization parameter Qc is from 1 to 31.

As shown in FIG. 12, when the value of the quantization parameter becomes larger, the image data become coarser and more DCT coefficients become zero data. Therefore, the size of the quantized data gets smaller and the size of the coded data also becomes smaller. On the other hand, the block-noise appears more clearly in the image that is constructed by decoding the coded data. In other words, the smaller the data size is, the more block-noise appears.

Thereby, in this embodiment, an upper limit of the quantization parameter "QcUpperLimit" is provided in order to prevent the quantization parameter Qc from getting larger than a certain level. The value of the upper limit of the quantization parameter QcUpperLimit is decided prior to the rate control. The rate control part 50 estimates the predicted data size of the coded data in the previous frame by using the data size of the quantized data in the previous frame. And the rate control part 50 then obtains the quantization parameter such that the quantization parameter is assignable and does not exceed the upper limit of the quantization parameter by using the predicted data size. Consequently, even when the rate control is performed in the above-described way, it can be prevented that the block-noise appears clearly in the image that is constructed by decoding the compressed coded data, because Qc≦QcUpperLimit.

On the other hand, when the value of the quantization parameter becomes smaller, the image data become denser and less DCT coefficients become zero data. Therefore, the size of the quantized data gets larger and the size of the coded data also becomes larger. At the same time, less block-noise appears in the image that is constructed by decoding the coded data. In other words, the larger the data size is, the lesser block-noise appears. For example, when the quantization parameter Qc is 1, though the quality of the decoded image can be highest, an amount of data used for the coded data in a frame becomes enormous. In this case, even noise of an imaging area that is invisible for human eyes also remains.

In consideration of the above-mentioned problem, the present embodiment has a lower limit of the quantization parameter "QcLowerLimit" in order to prevent the quantization parameter Qc from getting smaller than a certain level. The value of the lower limit of the quantization parameter QcLowerLimit is decided prior to the rate control. The rate control part 50 estimates the predicted data size of the coded data in the previous frame by using the data size of the quantized data in the previous frame. And the rate control part 50 then obtains the quantization parameter by using the predicted data size such that the quantization parameter is assignable and equal or greater than the lower limit of the quantization parameter. Consequently, even when the rate control is performed in the above-described way, the data size will not become large more than necessary because Qc≧QcLowerLimit.

As described above, though the rate control part 50 may obtain the quantization parameter by using the predicted data size such that the quantization parameter is equal to or less than the upper limit of the quantization parameter QcUpperLimit or is equal to or larger than the lower limit of the quantization parameter QcLowerLimit, the case is not limited to this.

The rate control part 50 may also obtain the quantization parameter by using the predicted data size such that the quantization parameter does not exceed the upper limit of the quantization parameter QcUpperLimit and is equal to or larger than the lower limit of the quantization parameter QcLowerLimit. In this case, the data size can be within a range of "RangeData" because the quantization parameter Qc is set within the rage of "RangeQc" shown in FIG. 12. Therefore, the rate control that optimizes the compression efficiency and the quality of the image can be easily realized.

When the compression process is taken place in each frame, a size of the coded data of some images (especially, artificial images) sometimes increases and there is a possibility that the bit rate cannot be securely maintained. Particularly, when the upper limit of the quantization parameter QcUpperLimit is provided as described above, the deterioration of the image quality can be prevented but the size of the coded data in each frame has to be increased. Therefore, there is a chance to hamper the maintenance of the bit rate.

In order to deal with the above-mentioned problem, the present embodiment has the frame skip part 60 that carries out the skip process on a certain condition as described above. More specifically, when the quantization parameter Qc is set so as not to exceed the upper limit QcUpperLimit, the frame skip part 60 conducts the skip process at timing when the frames, in which the quantization parameter Qc is larger than the skip threshold, appear in succession as many times as or more than the number of the skip succession threshold. In this way, the bit rate can be securely maintained while the deterioration of the image quality can be prevented. Alternatively, when the quantization parameter Qc is set so as not to exceed the upper limit QcUpperLimit, the frame skip part 60 conducts the skip process at timing when the complexity, which corresponds to the difference value between the image data quantized by the quantization part 20 and the image data of the previous frame, exceeds a complexity threshold. In this way, the bit rate can also be securely maintained while the deterioration of the image quality can be prevented.

3.1 Calculation Process of Quantization Parameter Qc

Next, a calculation process of the quantization parameter Qc that is carried out in the rate control part 50 will be described in detail.

In the following description, the quantization parameter is calculated by using the predicted data size and obtained such that the quantization parameter does not exceed the upper limit of the quantization parameter QcUpperLimit and is equal to or greater than the lower limit of the quantization parameter QcLowerLimit.

Figure 13:
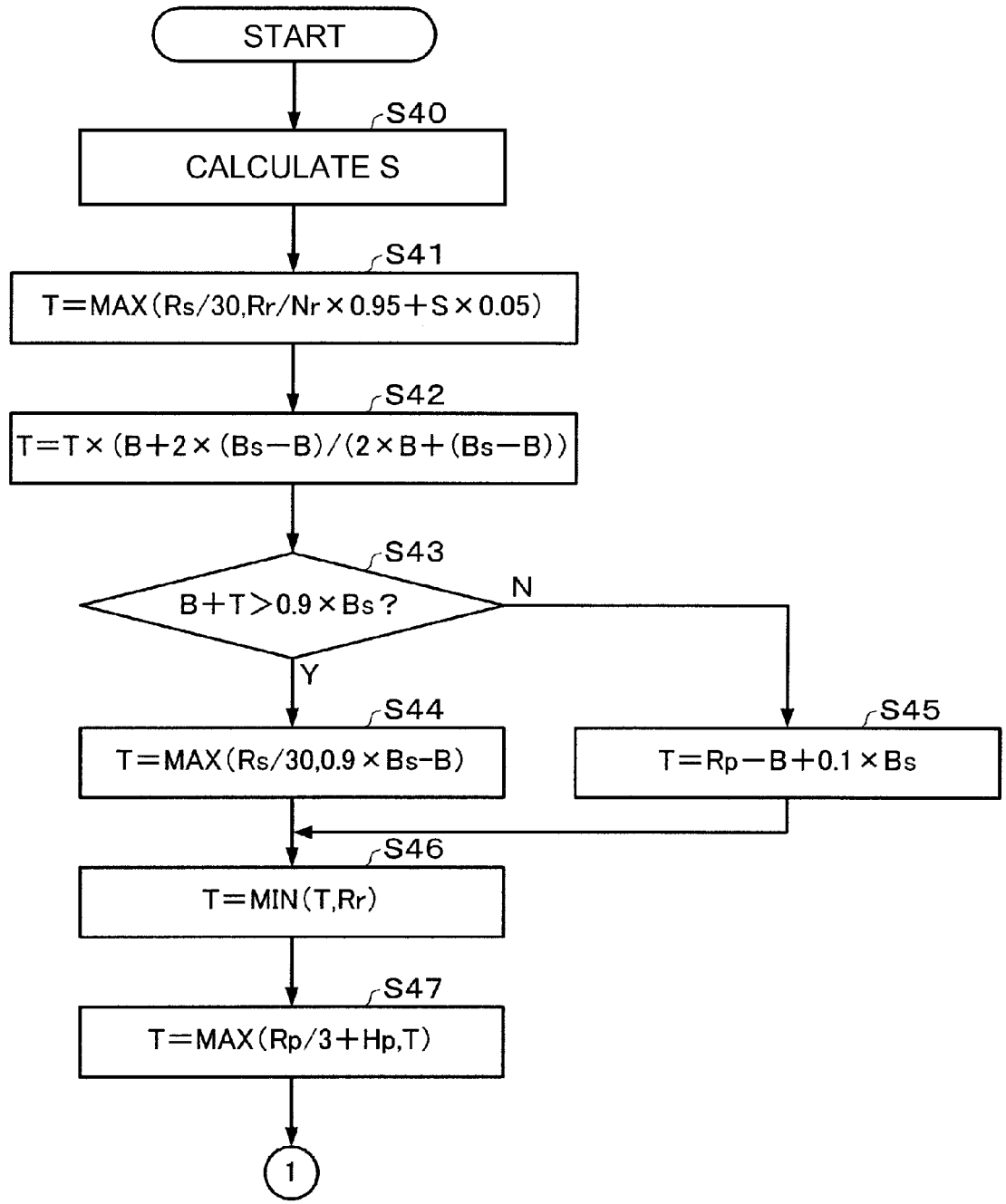
FIG. 13 is a first half flow diagram of an example of a calculation process to obtain the quantization parameter.
Figure 14:
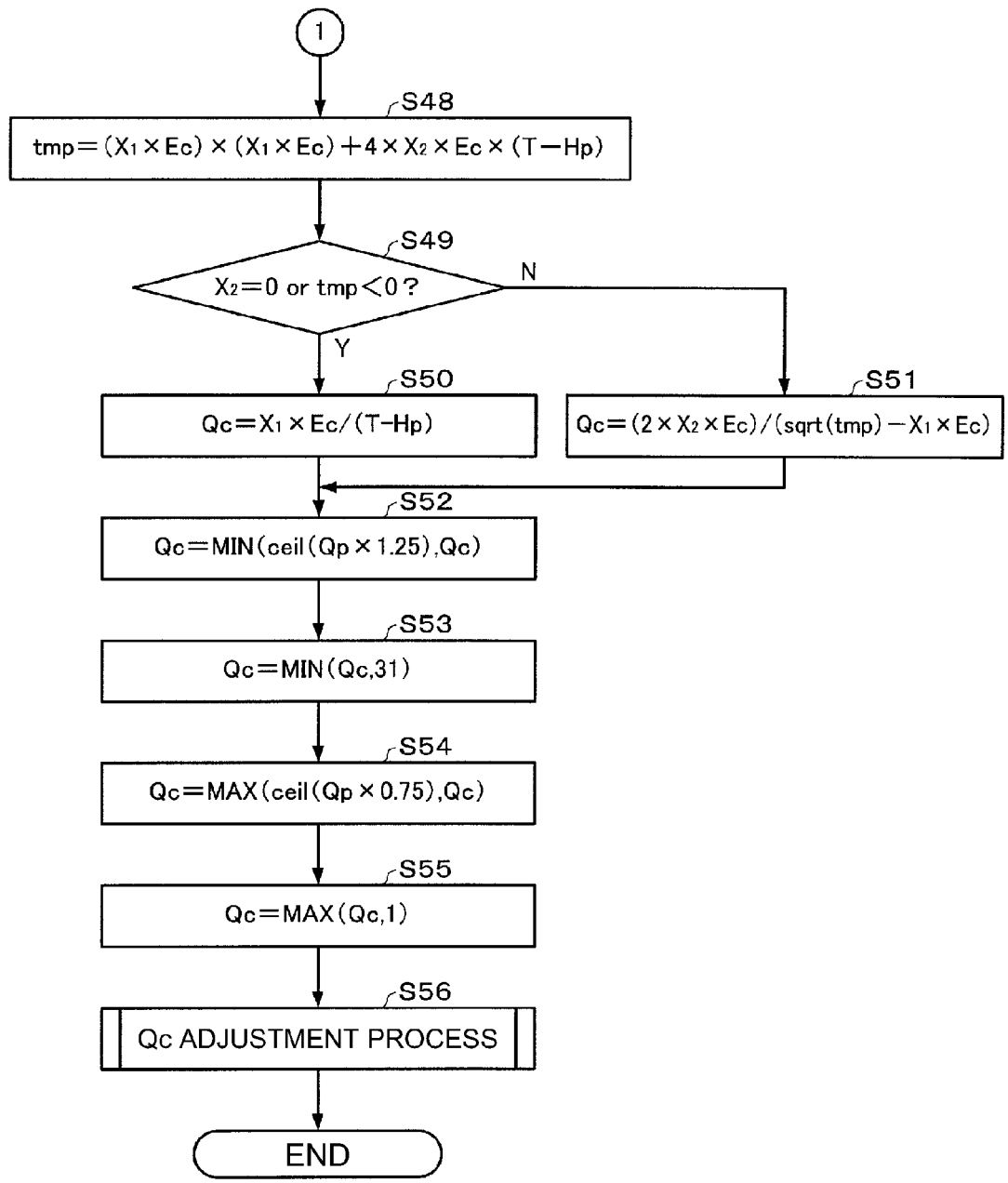
FIG. 14 is a last half flow diagram of the example of the calculation process to obtain the quantization parameter.

FIG. 13 and FIG. 14 are examples of a flow of the calculation process to obtain the quantization parameter Qc. The flow shown in FIG. 13 and FIG. 14 will be described with reference to an explanatory diagram of parameters used in the calculation process of the quantization parameter Qc shown in FIG. 15. The flow shown in FIG. 13 and FIG. 14 is repeated in each frame.

Firstly, the number of bits S used in the previous frame is calculated (Step 40 or S40). Here, the number of bits Rc used to encode (used to encode the present frame), which is derived in the previous frame, is set for the parameter S.

An example of a flow of the calculation process to obtain a value of the number of bits Rc that are used to encode is shown in FIG. 16. Here, the count data read out from the count register 32 is used as a data which is equivalent to the data size of the quantized data in the previous frame. The count data is assigned to $x_0$ and the $x_0$ is substituted for the formula (1). Then the predicted data size $y_0$ of the coded data in the present frame is derived from the formula (Step 60 or S60).

The predicted data size $y_0$ obtained in Step 60 is set as the number of bits Rc used for the encoding (Step 61 or S61).

The value of the parameter Rc obtained in the above-described way will be set for the parameter S in the next frame.

Returning to FIG. 13, the description continues. After the value of the parameter S is obtained, the number of bits T that are allocated to the present frame is calculated (Step 41 or S41). An average bits allocation number per frame (Rr/Nr) is obtained from the number of remaining usable bits Rr and the number of remaining encoding frames Nr. In Step 41, the number of bits T that are allocated to the present frame is derived from a ratio of the obtained average bits allocation number to the number of bits S allocated to the previous frame. For example, the ratio is 0.95:0.05 in Step 41. At the same time, the number of bits T allocated to the present frame is obtained so as not to become below a lower limit of Rs/30.

Next, the number of bits T allocated to the present frame is adjusted based on a ratio of the current number of occupied bits B in the FIFO buffer part 30 to the number of bits Bs in the FIFO buffer part 30 (Step 42 or S42). When the result turns out that the current number of occupied bits B in the FIFO buffer part 30 is smaller than the half of the number of bits Bs in the FIFO buffer part 30, the parameter T is adjusted so as to be a larger number. On the contrary, when the current number of occupied bits B is larger than the half of the number of bits Bs, the parameter T is adjusted so as to be smaller.

Then, it is judged whether an additional value of the current number of occupied bits B in the FIFO buffer part 30 and the parameter T exceeds 90% of the number of bits Bs or not (Step 43 or S43). When the additional value is considered to top the value of 90% of the number of bits Bs (Step 43: Y), a value, which is obtained by subtracting the value of the parameter B from the value of 90% of the number of bits Bs, is set (clipped) for the parameter T (Step 44 or S44). In other words, the additional value of the current number of occupied bits B in the FIFO buffer part 30 and the parameter T is set so as not to exceed the 90% of the number of bits Bs in the FIFO buffer part 30. In the same way as Step 41, the value for the parameter T is set so as not to become below the lower limit of Rs/30.

On the other hand, when it is concluded that the additional value is not exceeding 90% of the number of bits Bs (Step 43: N), a value, which is obtained by subtracting the value of the parameter B from an average bit number Rp that is generated per frame and adding the value of 10% of the parameter Bs to the subtracted result, is set for the parameter T (Step 45 or S45). In other words, the value, which is obtained by subtracting the average generated bits number Rp per frame from the additional value of the parameter Bs and the parameter T, is set so as not to become below the 10% of the number of bits Bs in the FIFO buffer part 30.

Following Step 44 or Step 45, the value of the parameter T is set so as not to be larger than the value of the number of remaining usable bits Rr (Step 46 or S46). Then, the parameter T is adjusted such that the value of the parameter T does not change radically between the frames (Step 47).

Next, in order to obtain the value of the quantization parameter Qc, the modeled formula shown in FIG. 6 is solved as a quadratic equation of the parameter Qc. To do this, firstly, a value of a parameter "tmp" is calculated as shown in FIG. 14 (Step 48 or S48).

Here, when the model parameter $X_2$ is 0 or the parameter tmp is a negative value (Step 49: Y), the quantization parameter Qc is derived from the modeled formula which is a linear equation (Step 50 or S50). Here, the parameter R is a value obtained by subtracting the number of bits Hp, which are for other than information such as headers and motion vectors and used in the previous frame, from the number of bits T allocated to the present frame. Therefore, the parameter R can be derived from the equation $Qc=X_1 \times Ec/(T-Hp)$. The value of the parameter Ec is the average of the absolute value of the pixel in the frame as shown in FIG. 6.

When the model parameter $X_2$ is not 0 and the value of the parameter tmp is equal to or more than 0 in Step 49 (Step 49: N), a solution of a quadratic equation derived from the modeled formula shown in FIG. 6 is set for the quantization parameter Qc (Step 51 or S51).

Following Step 50 and Step 51, the quantization parameter Qc is processed such that a difference between the value of the quantization parameter Qc and a value of a quantization parameter Qp in the previous frame falls within 25% and the value of the quantization parameter Qc is set to be 1-31 (Step 52, Step 53, Step 54 and Step 55). In Step 52 and Step 54, "ceil(x)" designates to round the value of x up to the nearest integer number In this embodiment, the value of the quantization parameter Qc obtained in Step 55 is further adjusted (Step 56 or S56) and then the series of the process is ended (End).

Figure 17:
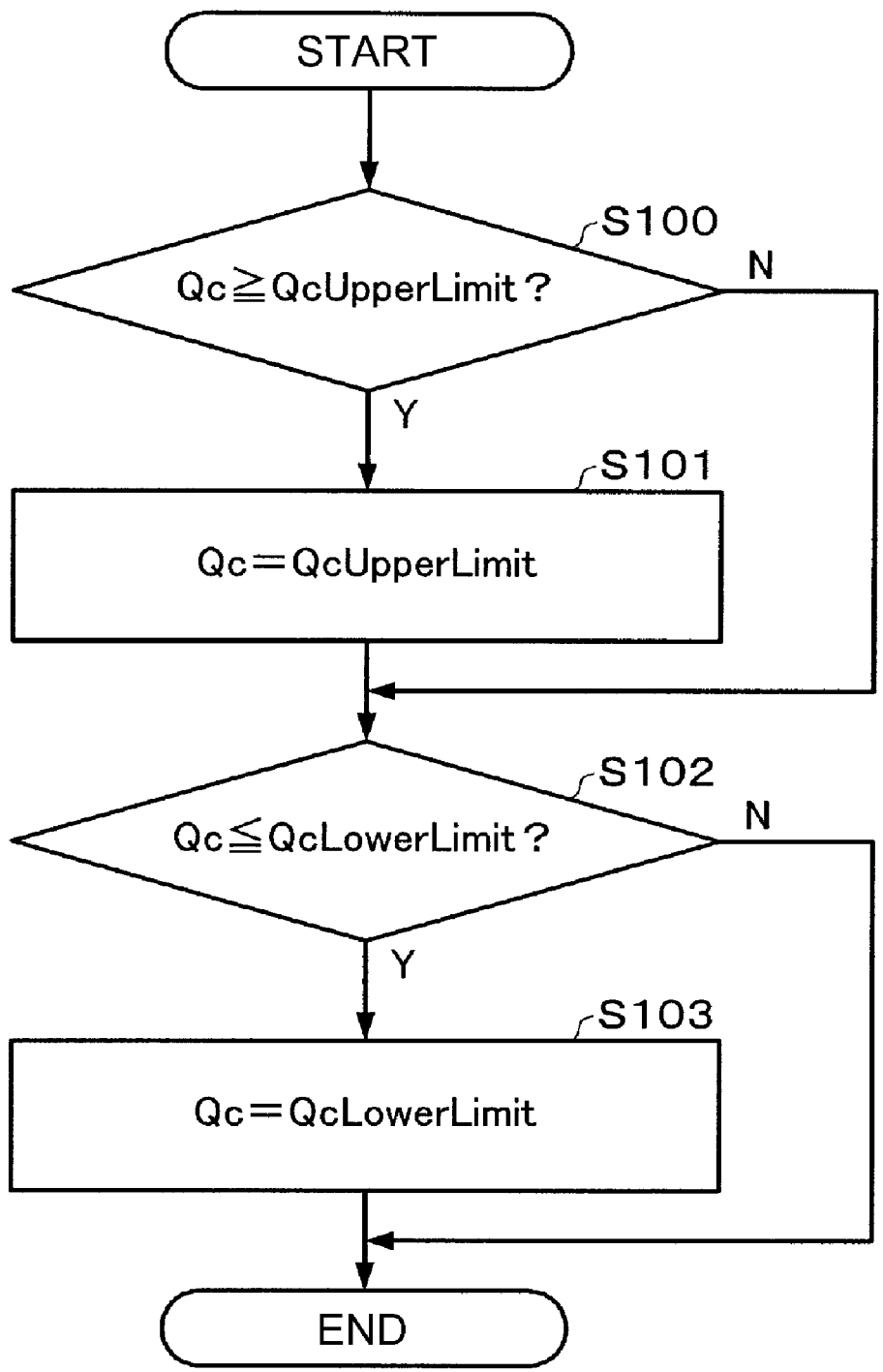
FIG. 17 is a flow diagram of an example of an adjusting process of the quantization parameter.

FIG. 17 shows an example of a flow for an adjusting process of the quantization parameter Qc.

Before stating the adjusting process, the value of the quantization parameter Qc obtained in Step 55 is judged whether it is equal to or more than the upper limit of the quantization parameter QcUpperLimit or not (Step 100 or S100).

When the value of the quantization parameter Qc is considered to be equal to or more than the upper limit of the quantization parameter QcUpperLimit (Step 100: Y), the value of the quantization parameter Qc is set for the upper limit QcUpperLimit (Step 101 or S101).

When the value of the quantization parameter Qc is concluded that it is not equal to or not more than the upper limit of the quantization parameter QcUpperLimit (Step 100: N) or following Step 101, the value of the quantization parameter Qc is judged whether it is equal to or smaller than the lower limit of the quantization parameter QcLowerLimit which is decided prior to this adjusting process or not (Step 102 or S102).

When the value of the quantization parameter Qc is considered to be equal to or smaller than the lower limit of the quantization parameter QcLowerLimit (Step 102: Y), the value of the quantization parameter Qc is set for the lower limit QcLowerLimit (Step 103 or S103).

When the value of the quantization parameter Qc is concluded that it is not equal to or not smaller than the lower limit of the quantization parameter QcLowerLimit (Step 102: N) or after Step 103, the value of the quantization parameter Qc at the time will be provided to the quantization part 20 (END in FIG. 17 and END in FIG. 14)

Though the adjusting process is performed in Step 56 in FIG. 14 and FIG. 17, the case is not limited to this. For example, in a case where Step 56 is not provided in FIG. 14, the value 31 in Step 53 may be replaced by the upper limit of the quantization parameter QcUpperLimit and the value 1 in Step 55 may be replaced by the lower limit of the quantization parameter QcLowerLimit.

The quantization step of the quantization part 20 is varied by providing the quantization parameter Qc obtained in the above-described way.

Figure 18:
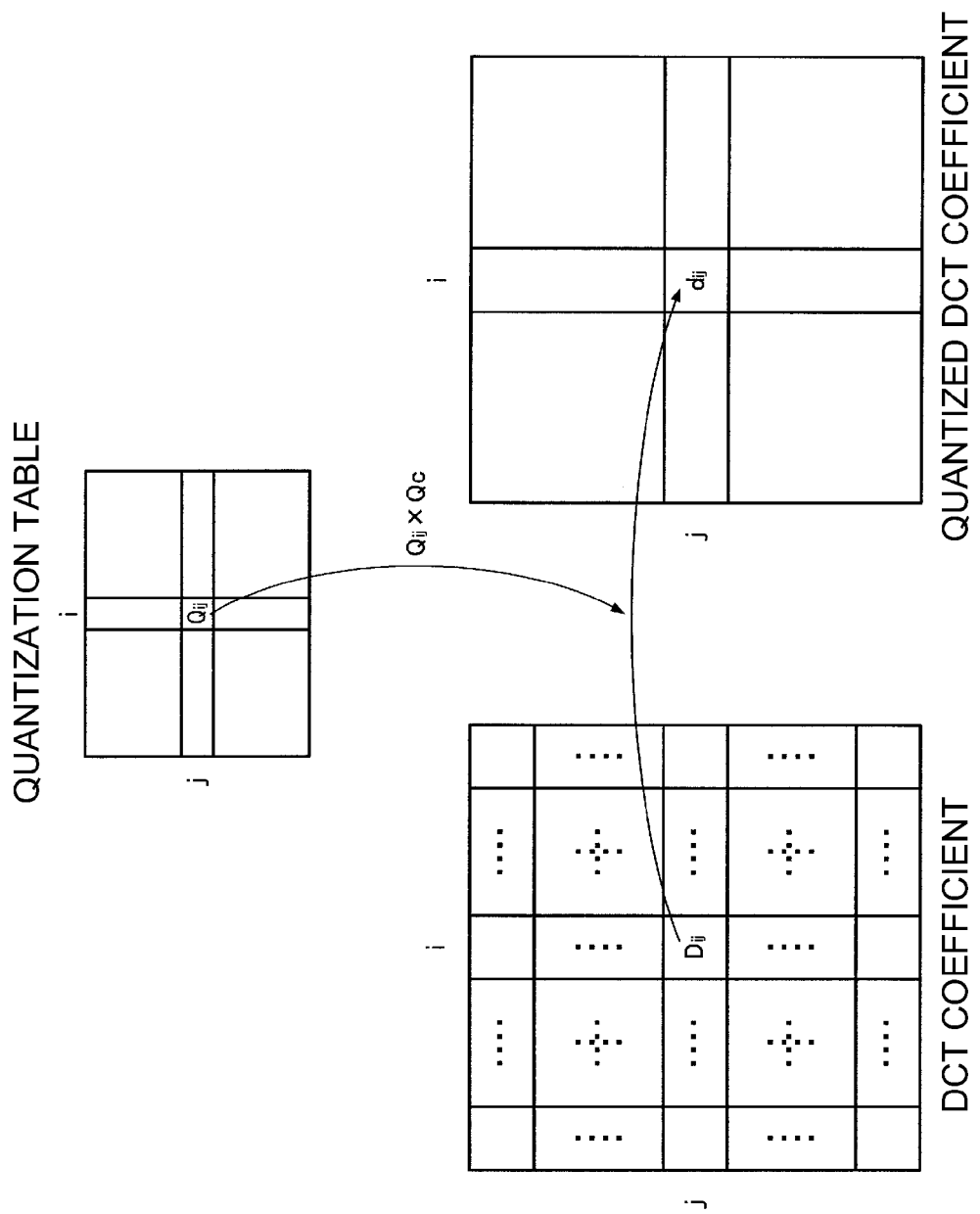
FIG. 18 is an explanatory drawing of a quantization process of the present embodiment.

In other words, for example, as shown in FIG. 18, a quantized DCT coefficient $d_{ij}$ is obtained by dividing a DCT coefficient $D_{ij}$ of the image data by the product of the quantization step value $Q_{ij}$ of the corresponding position in the quantization table and the quantization parameter Qc. Consequently, the zero data of the quantized DCT coefficient can be increased or decreased.

3.2 Frame Skip

Next, the skip process that is carried out in the frame skip part 60 will be described in detail.

Figure 19:
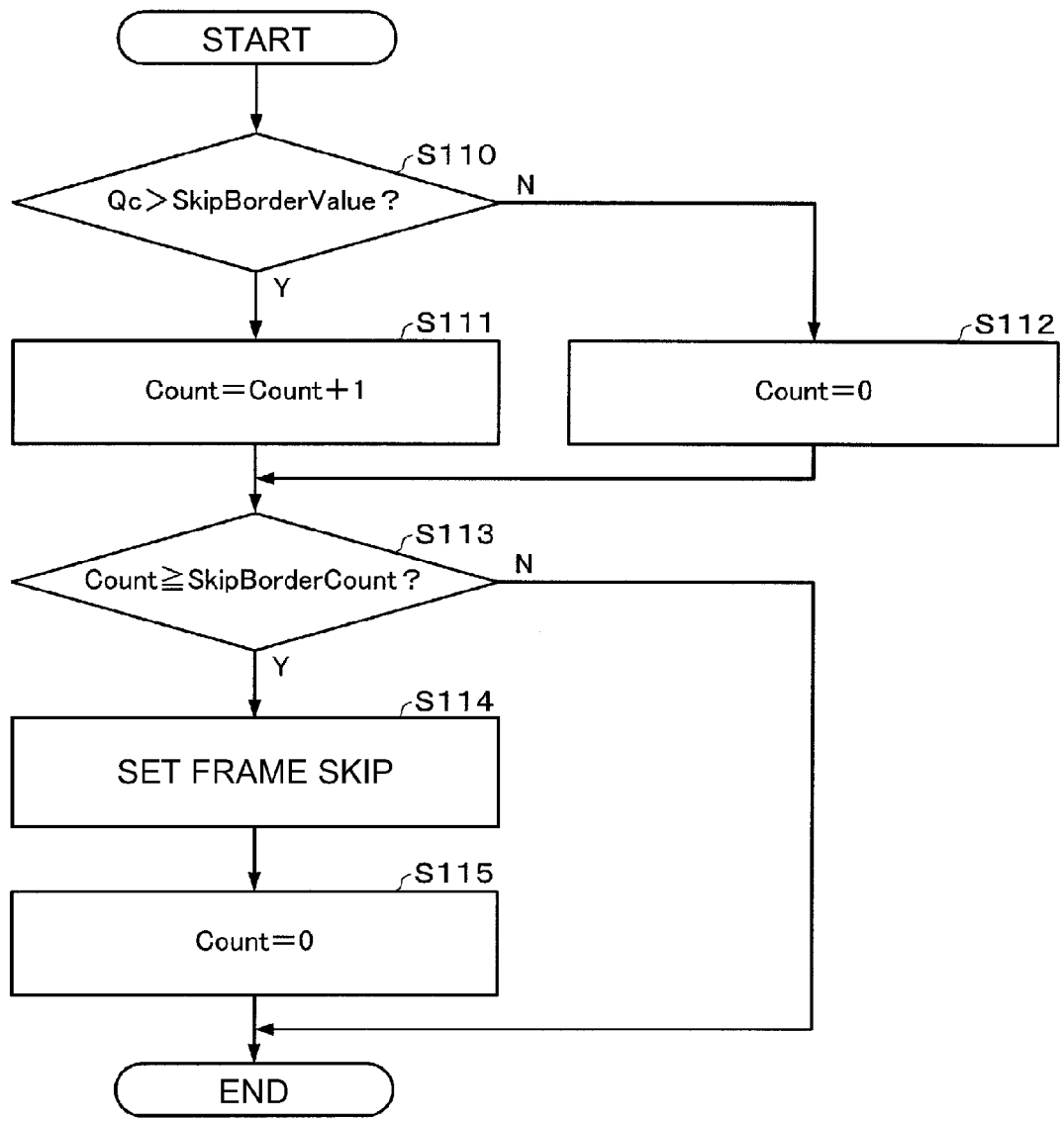
FIG. 19 is a flow diagram of an example of a skip process of the present embodiment.

FIG. 19 shows an example of a flowchart of the skip process conducted in the frame skip part 60. Here, a case that the skip process is performed based on the quantization parameter Qc obtained in the rate control part 50 as described in FIGS. 13-17 will be explained as a flow. The flow shown in FIG. 19 is carried out by frames.

Firstly, the value of the quantization parameter Qc obtained in the rate control part 50 is judged whether it is larger than a skip threshold "SkipBoderValue" or not (Step 110 or S110).

When the value of the quantization parameter Qc is considered to be larger than the skip threshold SkipBoderValue (Step 110:Y), a count number "Count" which is used to count the targeted frame for the skip process is incremented (Step 111 or S111). When the value of the quantization parameter Qc is considered to be equal or smaller than the skip threshold SkipBoderValue (Step 110: N), 0 is set for (clear) the count number Count (Step 112 or S112).

Following Step 111 or Step 112, the count number Count is judged whether it is equal or larger than a skip succession threshold "SkipBoderCount" or not (Step 113 or S113). When the count number Count is considered to be equal or larger than the value of the skip succession threshold SkipBoderCount (Step 113: Y), a frame skip setting for the skip process is conducted (Step 114 or S114). Furthermore, 0 is set for the count number Count (Step 115 or S115) and then the series of the processes is ended (END).

In the frame skip setting in Step 114, setting to skip the image data production in the image data processing unit 70 is taken place. For example, at least a part of the image data processing unit 70 can be initialized or a moving clock in the part of the image data processing unit 70 can be stopped by the frame skip setting. The present invention is not limited to such contents of the frame skip setting to perform the skip process. The present invention can be applied as long as the coded data is not generated in the end.

When the count number Count is considered to be smaller than the value of the skip succession threshold SkipBoder Count in Step 113 (Step 113: N), the series of the processes is ended (END).

The skip threshold SkipBoderValue and the skip succession threshold SkipBoderCount are set prior to the process shown in FIG. 19.

As described above, the frame skip part 60 performs the skip process to skip the encoding when the frames, in which the quantization parameter Qc calculated in each frame is larger than the skip threshold SkipBoderValue, appear in succession as many times as or more often than the skip succession threshold SkipBoderCount.

Figure 20:
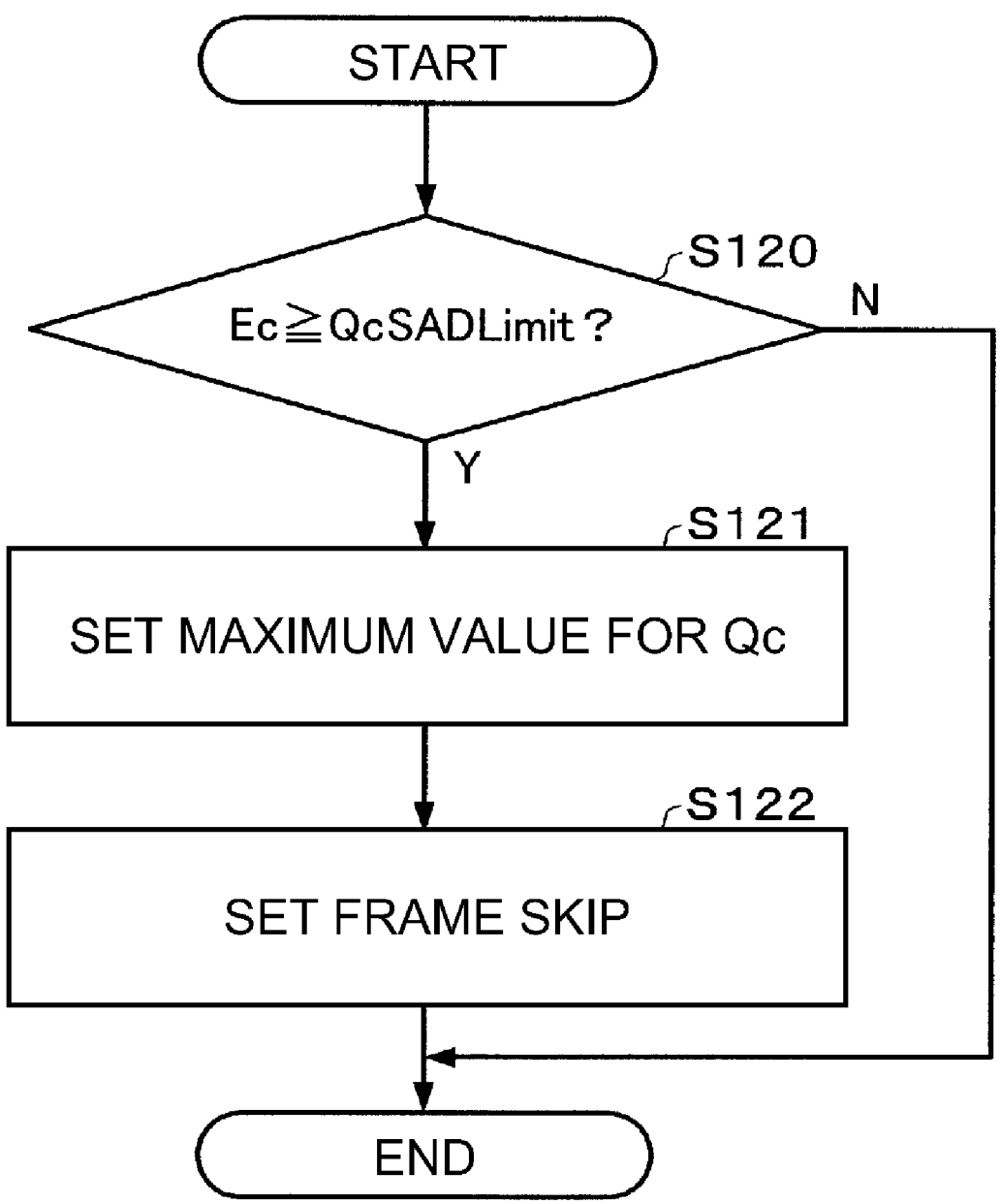
FIG. 20 is a flow diagram of other example of the skip process of the present embodiment.

FIG. 20 shows another example of the flowchart of the skip process conducted in the frame skip part 60. Here, a flow of a case that the skip process is performed based on the complexity Ec of the frame will be explained. The flow shown in FIG. 20 is carried out by frames.

Firstly, the frame skip part 60 judges whether the complexity Ec of the present frame is equal or larger than a complexity threshold "QcSADLimit" or not (Step 120 or S120). The complexity Ec of the present frame is also used to calculate the quantization parameter Qc. Here, the present frame can be referred as the frame in which the image data is quantized by the quantization part 20. The complexity is information that corresponds to the difference value between the image data of the present frame and the image data of the previous frame.

When the complexity Ec is considered to be equal or larger than the complexity threshold "QcSADLimit (S120: Y), a maximum value is set for the quantization parameter Qc (Step 121 or S121). The maximum value here is "31" of Step 53 in FIG. 14 or the upper limit of the quantization parameter QcUpperLimit of Step 101 in FIG. 17. The rate control part 50 performs the rate control by using the value of the quantization parameter Qc set in Step 121.

When the maximum value is set for the quantization parameter Qc in the above-described way, the frame skip setting for the skip process is carried out (Step 122 or S122). This frame skip setting is the same procedure as that of the frame skip setting of Step 114 shown in FIG. 19.

In Step 120, if the complexity Ec is considered to be smaller than the complexity threshold "QcSADLimit (S120: N), the series of the processes is ended (END).

The complexity threshold "QcSADLimit is set prior to the process shown in FIG. 20.

As described above, the frame skip part 60 can perform the skip process when the complexity Ec is equal or larger than the complexity threshold "QcSADLimit.

The process which the frame skip part 60 carried out is not limited to the one shown in FIG. 19 and FIG. 20. The frame skip part 60 can also perform processes in which the processes shown in FIG. 19 and FIG. 20 are combined and carries out the frame skip setting.

Figure 21:
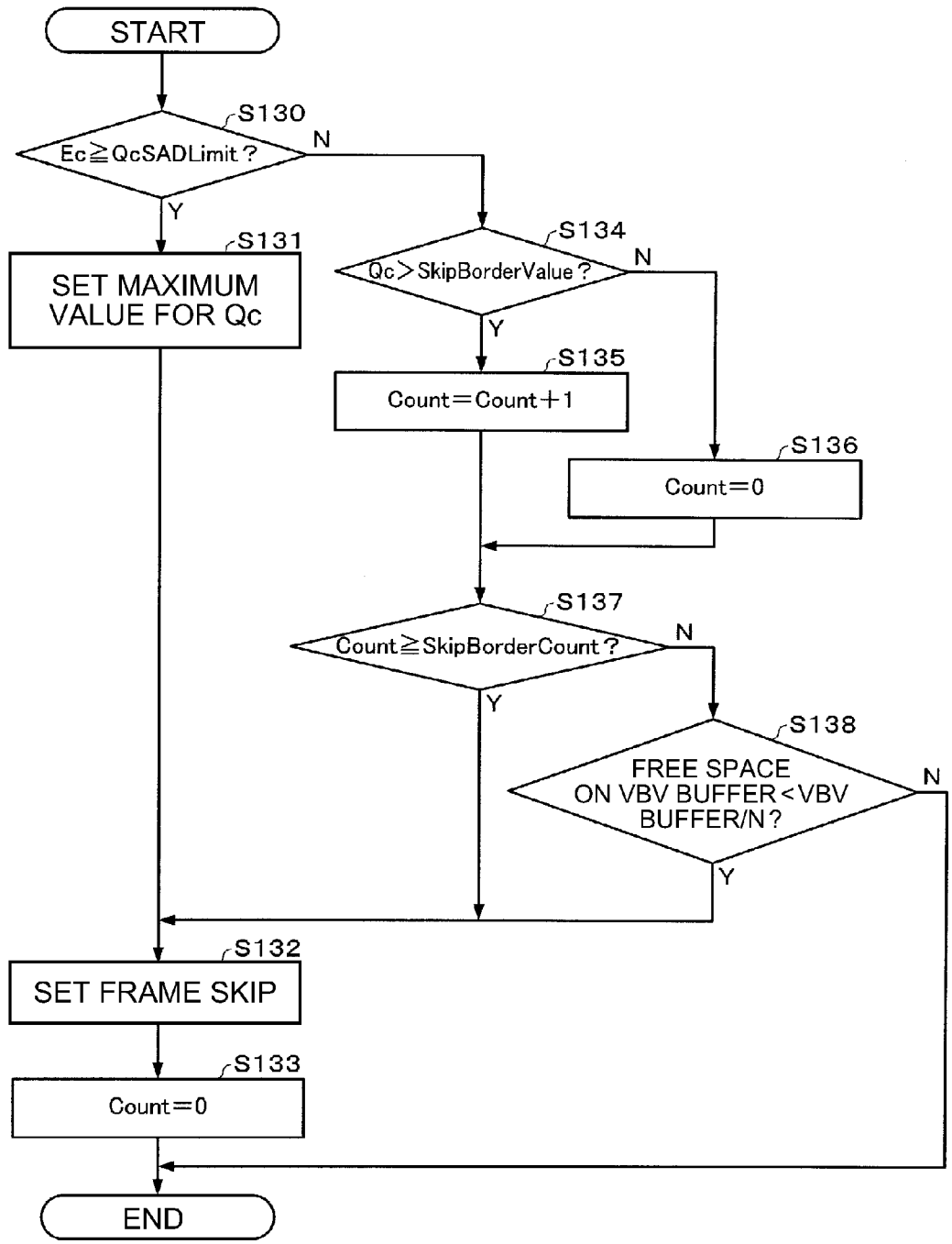
FIG. 21 is a flow diagram of other example of the skip process of the present embodiment.

FIG. 21 shows another example of the flowchart of the skip process conducted in the frame skip part 60. Basically, after judging whether the skip process based on the complexity as shown in FIG. 20 is taken place or not, it is judged whether the skip process based on the quantization parameter as shown in FIG. 19 is carried out or not.

In FIG. 21, a virtual buffer verifier called Video Buffering Verifier (VBV) buffer is provided and the skip process is performed in order to control the generation rate of the coded data. The VBV buffer can be considered as a virtual decoder to which an output of the coded data formation part 40 is conceptually coupled. The coded data is generated in the coded data formation part 40 in the way that the VBV buffer will not overflow or underflow.

Firstly, the frame skip part 60 judges whether the complexity Ec is equal or larger than the complexity threshold "QcSADLimit" or not (Step 130 or S130). When the complexity Ec is considered to be equal or larger than the complexity threshold "QcSADLimit (S130: Y), the maximum value is set for the quantization parameter Qc (Step 131 or S131). When the maximum value is set for the quantization parameter Qc, the frame skip setting for the skip process is carried out (Step 132 or S132). Then, 0 is set for the count number Count that is a number for counting the frames in which the skip processes are conducted (Step 133 or S133). And then, the series of the processes is ended (END). Here, Step 131 is the same process as that of Step 121 and Step 132 is the same as process as that of Step 114.

In Step 130, if the complexity Ec is considered to be smaller than the complexity threshold "QcSADLimit (S130: N), the value of the quantization parameter Qc is judged whether it is larger than the skip threshold "SkipBoderValue" or not (Step 134 or S134). When the value of the quantization parameter Qc is considered to be larger than the skip threshold SkipBoderValue (Step 134:Y), the count number "Count" is incremented (Step 135 or S135). When the value of the quantization parameter Qc is considered to be equal or smaller than the skip threshold SkipBoderValue (Step 134: N), 0 is set for the count number Count (Step 136 or S136).

Following Step 135 and Step 136, the count number Count is judged whether it is equal or larger than the number of the skip succession threshold SkipBoderCount or not (Step 137 or S137). When the count number Count is considered to be equal or larger than the number of the skip succession threshold SkipBoderCount (Step 137: Y), move on to Step 132.

When the count number Count is considered to be smaller than the value of the skip succession threshold SkipBoderCount in Step 137 (Step 137: N), a free space of the above-mentioned VBV buffer is judged whether it is smaller than a buffer size of the VBV buffer/N (where N is a positive integer, for example, N=3) or not (Step 138 or S138). When the free space of the VBV buffer is considered to be smaller than the buffer size of the VBV buffer/N (Step 138: Y), move to Step 132 and the skip process is carried out. On the other hand, in Step 138, when the free space of the VBV buffer is considered to be equal or larger than the buffer size of the VBV buffer/N (Step 138: N), the series of the processes is ended (END).

3.3 Configuration Example

Figure 22:
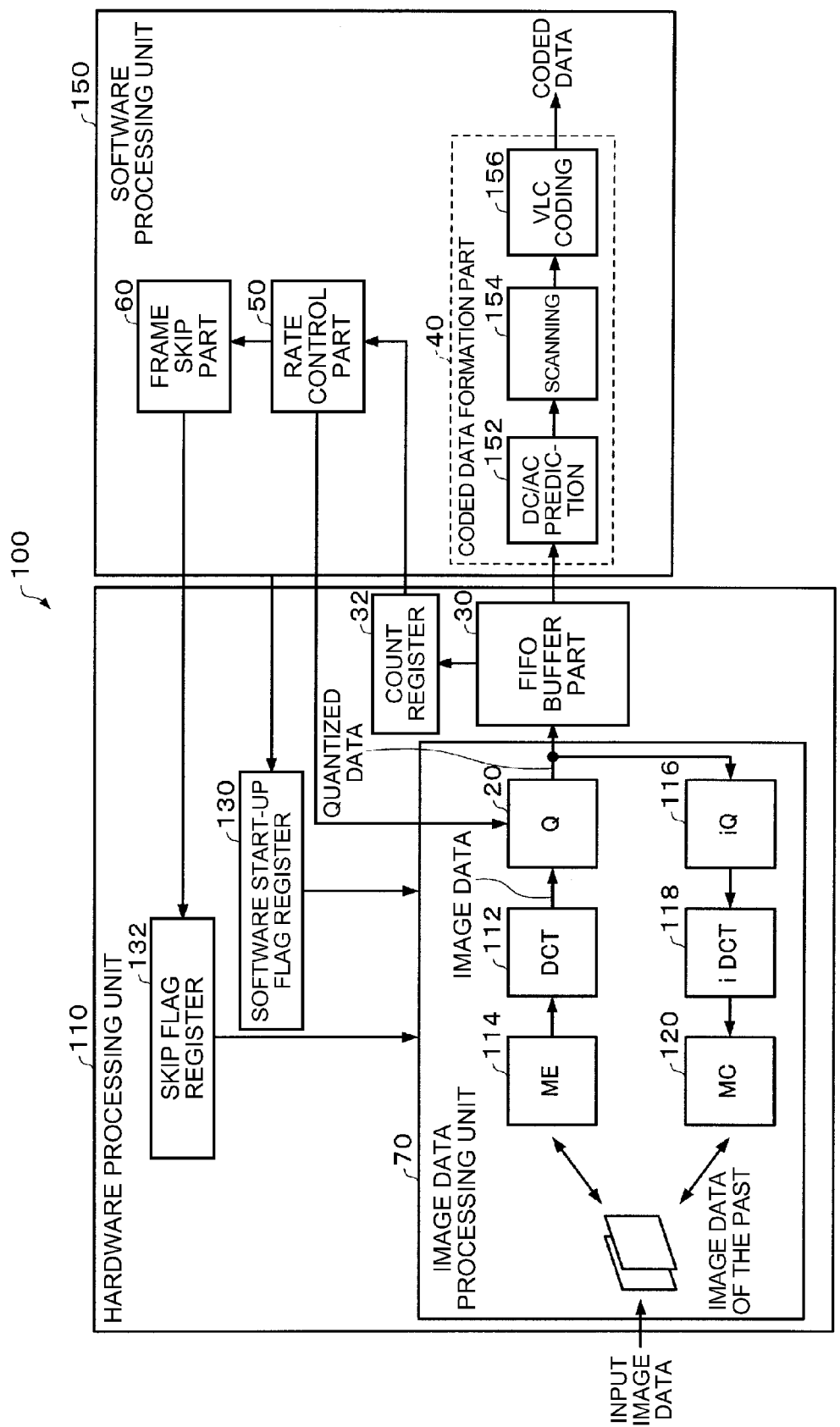
FIG. 22 is a detail functional block diagram of the image data compression device of the present embodiment.

FIG. 22 is a detail functional block diagram of the image data compression device according to the present embodiment. The same structures as those of the image data compression device 10 shown in FIG. 8 are given the identical numerals and those explanations will be accordingly omitted.

An image data compression device 100 shown in FIG. 22 conducts a compression process of image data of a motion image that meets the MPEG-4 standards. The image data compression device 100 includes a hardware processing unit 110 and a software processing unit 150.

In the hardware processing unit 110, the hardware processes the image data of the motion image. The hardware processing unit 110 includes the image data processing unit 70 having the quantization part 20, the FIFO buffer part 30, a software start-up flag register 130 and a skip flag register 132. The hardware processing unit 110 is composed of hardware such as Application Specific Integrated Circuits (ASIC) and exclusive use circuits without using any software.

In the software processing unit 150, the quantized data that is read out from the FIFO buffer part 30 is encoded by software and the coded data is generated. The software processing unit 150 includes the coded data formation part 40, the rate control part 50 and the frame skip part 60. The software processing unit 150 is a processor whose function is performed by software (firmware) or CPU (hardware) and the like in which the software (firmware) is installed.

To be more specific, the image data processing unit 70 in the hardware processing unit 110 includes a discrete cosine transformation (DCT) part 112, a motion estimation part 114, an inverse quantization part 116, an inverse DCT part 118 and a motion compensation part 120. The DCT part 112 performs the process of Step 2 shown in FIG. 1A. The inverse quantization part 116 carries out the process of Step 4 shown in FIG. 1A. The inverse DCT part 118 conducts the process of Step 5 shown in FIG. 1A. The motion compensation part 120 executes the process of Step 6 shown in FIG. 1A.

In other words, the hardware processing unit 110 outputs a difference value between an input image data of the present frame and the old image data in the previous frame as a motion vector data. The discrete cosine transformation is performed to the motion vector data and the transformed data is output to the quantization part as the image data. Furthermore, the hardware processing unit generates the old image data based on the inversely quantized data obtained by quantizing the quantized data inversely with the quantization step.

When the software start-up flag register 130 is setup, the above-mentioned process of the hardware processing unit 110 is started. The software start-up flag register 130 is setup by the software processing unit 150. More particularly, in an interruption process which tells that the supply of the input image data is started, the software processing unit 150 sets the software start-up flag register 130 (software start-up flag information is set in a state of set).

Furthermore, when the skip flag register 132 is set, the image data production in the image data processing unit 70 is skipped. More particularly, when the frame skip part 60 judges to perform the skip process on the above-mentioned condition, the software processing unit 150 (the frame skip part 60) set the skip flag register 132 (skip flag information is set in the state of set). The skip flag register 132 is reset by every frame. In this case, the skip flag register 132 can be reset (set in a reset status) by the hardware or can be reset by frames by the software processing unit 150.

The hardware processing unit 110 does not have to have all of the above-mentioned components. The hardware processing unit 110 can be composed even if at least one component is omitted out of the above-mentioned components.

The coded data formation part 40 in the software processing unit 150 includes a DC/AV prediction part 152, a scanning part 154 and a VLC coding part 156. The DC/AV prediction part 152 carries out the process of Step 7 shown in FIG. 1A. The scanning part 154 conducts the process of Step 8 shown in FIG. 1A. The VLC coding part 156 executes the process of Step 9 shown in FIG. 1A.

The software processing unit 150 does not have to have all of the above-mentioned components. The software processing unit 150 can be composed even if at least one component is omitted out of the above-mentioned components. For example, the software processing unit 150 may encode the quantized data, which is read out from the FIFO buffer part 30, into the variable length code. The software processing unit 150 may also perform the scan process in which the quantized data read out from the FIFO buffer part 30 are rearranged and the result of the scan process may be encoded to be the variable length code. Furthermore, the software processing unit 150 may also calculate the DC component and the AC component from the quantized data read out from the FIFO buffer part 30, perform a scan process in which the DC component and the AC component are rearranged and the result of the scan process may be encoded to be the variable length code.

Here, the reason why Steps 1-6 are processed by the hardware and Steps 7-10 are processed by the software in this embodiment is given. Firstly, after the quantization of Step 3 shown in FIG. 1A, zero data predominantly exist in each block as shown in FIG. 5 and there are not many types of the information of the data compared with the data before quantized (FIG. 3). Furthermore, a load of the calculation in Steps 7-10 itself is small. Therefore, the load of the process is small even when Steps 7-10 in FIG. 1A are processed by the software. On the other hand, the quantization in Step 3 shown in FIG. 1A, the DCT in Step 2, the inverse DCT in Step 5 and the like have a large information volume and their calculation processes are complex. Therefore, the load which is imposed to perform such processes is too heavy for the software. Though the loads of the quantization, the DCT, the inverse DCT, the motion compensation and the like are heavy, there is not much need for modification since standards are set. Furthermore, these processes are appropriate for the hardware because many repeated processes exist in Steps 1-6 in FIG. 1A. Moreover, an amount of data that are transmitted from the hardware processing unit 110 to the software processing unit 150 is small because the amount of data after the quantization in the hardware processing unit 110 is small as described above. Therefore, the burden imposed on data transmission control can be lightened.

Figure 23:
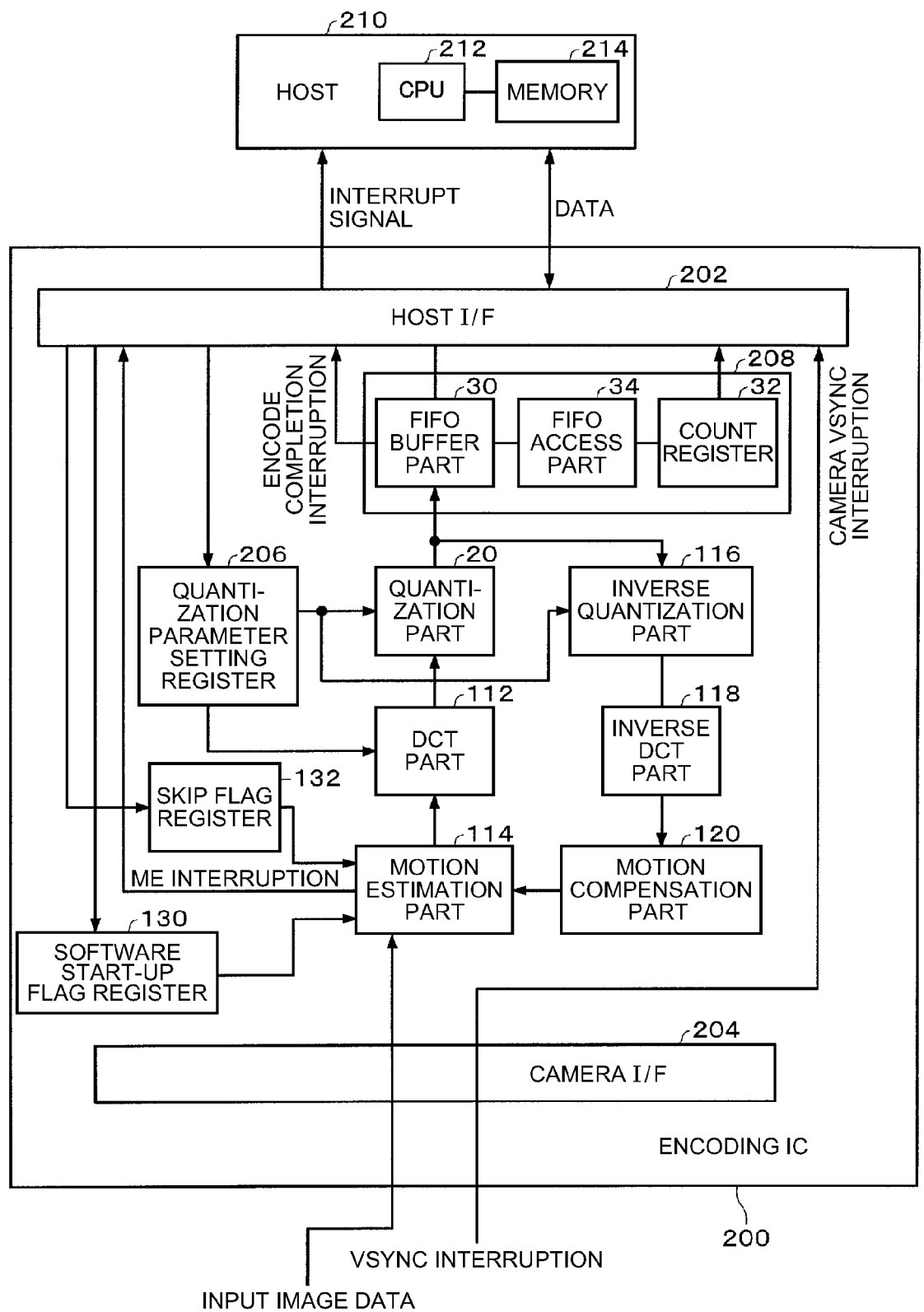
FIG. 23 shows a hardware configuration example of the image data compression device shown in FIG. 22.

FIG. 23 shows a hardware configuration example of the image data compression device 100. Here, the hardware processing unit 110 shown in FIG. 22 is integrated and mounted in a semiconductor device as an encoding IC (encoder in a broad sense) 200. The function of the software processing unit 150 shown in FIG. 22 is realized by a host 210. In FIG. 23, the same structures as those of the hardware processing unit 110 shown in FIG. 22 are given the identical numerals and those explanations will be accordingly omitted.

The host 210 includes a CPU 212 and a memory 214. In the memory 214, a program which realizes the functions of the coded data formation part 40, the rate control part 50 and the frame skip part 60 is stored. The CPU 212 also realizes the functions of the coded data formation part 40, the rate control part 50 and the frame skip part 60 by reading out the program stored in the memory 214 and conducting the processes based on the program.

Here, the encoding IC 200 encodes the image data of the motion image taken by an unshown camera module (imaging unit in a broad sense) in conformity with the MPEG-4 standard and generates the coded data at a regular rate. For this purpose, the encoding IC 200 includes a host interface (Interface or I/F) 202, a camera I/F 204 (image input interface in a broad sense), a quantization parameter setting register 206, the software start-up flag register 130 and the skip flag register 132 in addition to circuits that realize the function of the each components in the hardware processing unit 110 shown in FIG. 22.

In the process of the host 210, the skip flag register 132 is set. When the skip flag register 132 is set, the image data production in the image data processing unit 70 is skipped. In FIG. 23, when the skip flag register 132 is set, the image data production in the image data processing unit 70 is skipped by initializing an internal state of the motion estimation part 114.

Figure 24:
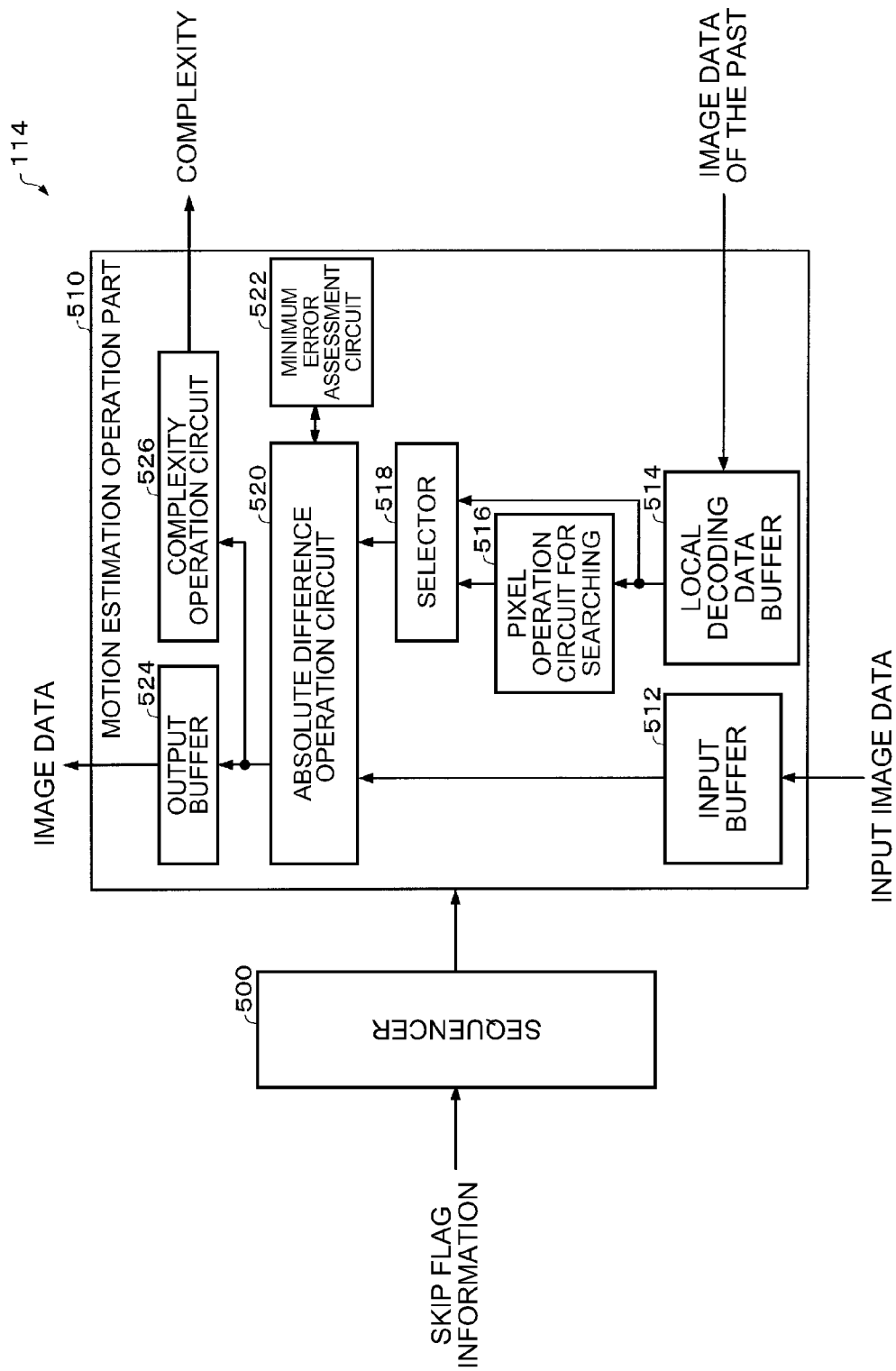
FIG. 24 shows a hardware configuration example of a motion estimation part shown in FIG. 23.

FIG. 24 shows a hardware configuration example of the motion estimation part 114 shown in FIG. 23. The present invention shall not be limited to the configuration of the motion estimation part 114 shown in FIG. 24.

The motion estimation part 114 includes a sequencer 500 and a motion estimation operation part 510. The motion estimation operation part 510 calculates the motion vector information and the like based on a control signal from the sequencer 500 and outputs the result as the image data to the DCT part 112. The sequencer 500 transits among the plurality of predetermined states, outputs a control signal in each state and controls the process for the motion estimation by controlling the components of the motion estimation operation part 510.

In the motion estimation operation part 510, the input image data is stored in an input buffer 512. The old image data from the motion compensation part 120 is stored in a local decoding data buffer 514. The motion estimation part 114 outputs motion vector information at which a summation of absolute difference value of each pixel between the input image data and the old image data becomes smallest. For this reason, a pixel operation circuit for searching 516 calculates a searching pixel value (for example, average of luminance component of adjacent two points or four points) for the pixels of the old image data stored in the local decoding data buffer 514. A selector 518 outputs the pixel operation circuit for searching 516 or the local decoding data buffer 514.

An absolute difference operation circuit 520 calculates a summation of absolute difference value between the pixel of the input image data stored in the input buffer 512 and the pixel of the output of the selector 518. A minimum error assessment circuit 522 assesses whether the summation of the absolute difference value is minimum or not. When the minimum error assessment circuit 522 judges the calculated result of the absolute difference operation circuit 520 to be the minimum value, it outputs the result to an output buffer 524. In other words, the value of the old image data pixel and the value of the pixel for searching are repeatedly calculated until the calculated result of the absolute difference operation circuit 520 becomes a minimum value by the assessment of the minimum error assessment circuit 522.

In the above-described way, the motion vector information that is output to the output buffer 524 is provided to the DCT part 112 as the image data. A complexity operation circuit 526 calculates the complexity Ec as described above and can output the complexity Ec to the host 210.

The skip flag information of the skip flag register 132 is input to the sequencer 500 of such motion estimation part 114. When the skip flag information is set in the setting status, the sequencer 500 initializes the internal state of the motion estimation part 114. In other words, the motion estimation part 114 stops the motion estimation process as soon as the flag register 132 is set.

Even though this embodiment has the FIFO buffer part 30 as described above, the data size of the coded data can be predicted as the predicted data from the access number of the FIFO buffer part 30, and the bit rate can be controlled based on the predicted data. Furthermore, when it is considered that the predetermined bit rate cannot be realized, the process of the motion estimation part 114 can be halted and image data generation can be skipped. In other words, the predicted data size of the coded data in the previous frame is obtained from the data size of the quantized data in the previous frame, and the image data generation of the present frame can be skipped according to the predicted data size.

In FIG. 23, the encoding IC 200 includes a FIFO part 208. The FIFO part 208 includes the FIFO buffer part 30, the count register 32 and a FIFO access part 34. The FIFO access part 34 controls the writing of the quantized data from the quantization part 20 to the FIFO buffer part 30 as well as conducts a process to renew the count data stored in the count register 32. To be more specific, the FIFO access part 34 controls the writing of the quantized data to the FIFO buffer part 30 in a predetermined number of bytes. The FIFO access part 34 increments the count data and renews the count register 32 every time the control of the writing to the FIFO buffer part 30 is preformed. When a one frame worth of the quantized data is written into the FIFO buffer part 30, the number of the writing (accesses) that corresponds to the data size of the quantized data is stored in the count register 32.

The encoding IC 200 and the host 210 achieve the function of the image data compression device shown in FIG. 8 and FIG. 22 by exchanging data with an interrupt signal.

The host I/F 202 carries out an interface process with the host 210. More particularly, the host I/F 202 generates the interrupt signal for the host 210 and from the encoding IC 200 and controls data transmission between the host 210 and the encoding IC 200. The host I/F 202 is coupled onto the FIFO buffer part 30 and the count register 32.

The camera I/F 204 performs an interface process in order to input an input image data of a motion image from the unshown camera module. The camera I/F 204 is coupled to the motion estimation part 114.

The unshown camera module supplies the image data of the motion image taken by the camera as the input image data to the encoding IC 200. At the same time, the camera module also supplies a VSYNC signal (vertical sync signal) which assigns a frame separation of the input image data to the encoding IC 200. The encoding IC 200 notifies the host 210 of a camera VSVNC interruption through the host I/F 202 when the camera I/F 204 accepts the VSYNC signal as the VSVNC interruption. This makes it possible for the host 210 to perform a predetermined additional process before starting the encoding.

In FIG. 23, at least a one frame worth of quantized data is written in the FIFO buffer part 30 in a phase where the motion estimation is performed. When the motion estimation by the motion estimation part 114 is finished, the motion estimation part 114 sends a motion estimation completion interrupt (ME interrupt) to the host 210 through the host I/F 202.

Figure 25:
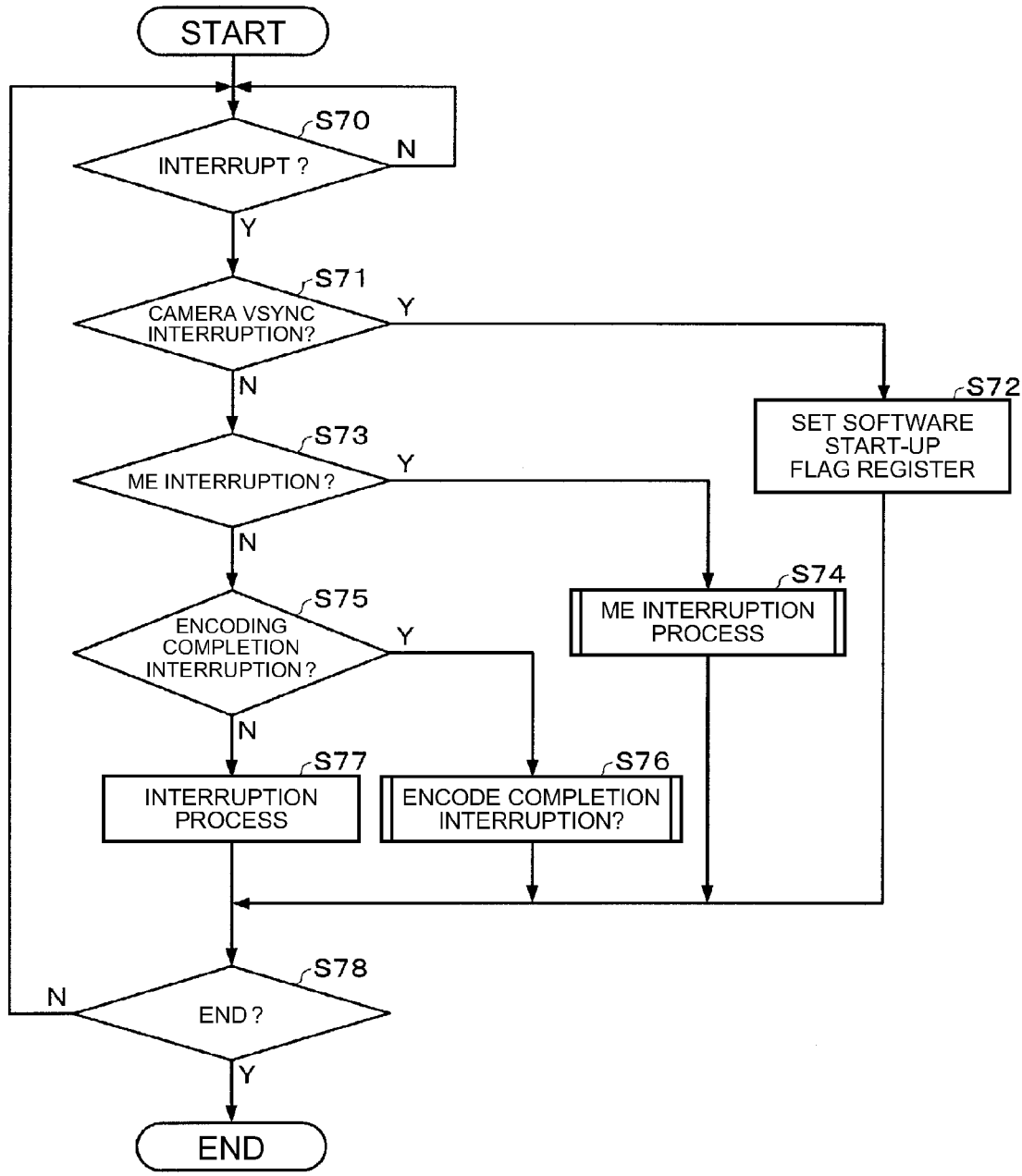
FIG. 25 is a flow diagram of an example of an interruption accepting process carried out in a host.

FIG. 25 shows an example of a flow of a process to accept the interruption that is carried out in the host 210. A program which realizes the process shown in FIG. 25 is stored in the memory 214. The CPU 212 reads this program and carries out the process shown in FIG. 25.

Firstly, the CPU 212 monitors an interrupt input (Step 70: N). When the CPU 212 detects the interrupt (Step 70: Y), it judges whether the interrupt is a camera VSYNC interruption or not (Step 71 or S71).

When the CPU 212 concludes that the interrupt is the camera VSYNC interruption (Step 71: Y), a process to set the software start-up flag register 130 is performed (Step 72 or S72).

If the CPU 212 concludes that the interrupt is not the camera VSYNC interruption in Step 71 (Step 71: N), it judges whether the interrupt is the ME interrupt which will be described later or not (Step 73 or S73).

When the CPU 212 considers the interrupt to be the ME interrupt (Step 73: Y), the ME interrupt is conducted (Step 74 or S74).

If the CPU 212 concludes that the interrupt is not the ME interrupt in Step 73 (Step 73: N), the CPU 212 judges whether it is an encoding completion interrupt which will be described later or not (Step 75 or S75). When the CPU 212 concludes that the interrupt is the encoding completion interrupt (Step 75: Y), an encoding completion interrupting process which will be described later is performed (Step 76 or S76).

If the CPU 212 concludes that the interrupt is not the encoding completion interrupt in Step 75 (Step 75: N), a predetermined interrupt process is performed (Step 77 or S77).

When it is not the end (Step 78: N) followed by Step 72, Step 74, Step 76 and Step 77, return to Step 70. When it is the end (Step 78: Y), the series of the processes is ended (END).

Returning to FIG. 23 and the description is continued. When the software start-up flag register 130 is set by the host 210 though the host I/F 202, the encoding is started in the encoding IC 200.

The motion estimation part 114 will not perform the motion estimation to the first input image data which is the first one to be loaded after the encoding is started, but the motion estimation part 114 conducts the motion estimation after the input image data of the next frame is loaded. Here, since the detail of the motion estimation has been already described above, description for operations of the inverse quantization part 116 and the like will be omitted. When the motion estimation of the motion estimation part 114 finishes, the motion estimation part 114 notifies the host 210 through the host I/F 202 of the motion estimation completion interrupt (ME interrupt).

Figure 26:
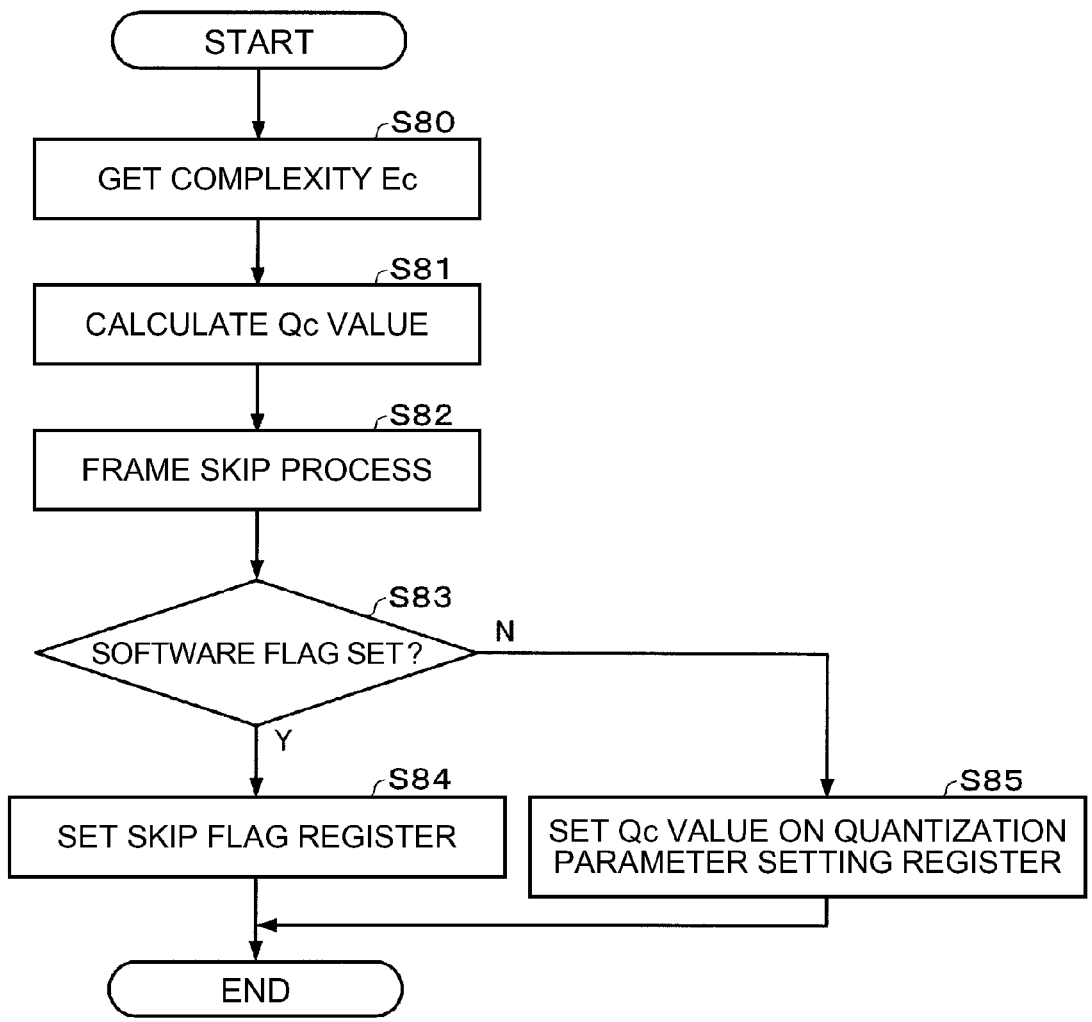
FIG. 26 is a flow diagram of an example of ME interrupting process.

FIG. 26 is an example of a flow of the ME interrupting process. A program which realizes the process shown in FIG. 26 is stored in the memory 214. The CPU 212 reads this program and carries out the process shown in FIG. 26.

This ME interrupting process is performed in Step 74 in FIG. 25.

When the ME interrupt is detected, the CPU 212 reads out the complexity Ec generated by the motion estimation part 114 through the host I/F 202 (Step 80 or S80). This complexity Ec is derived from the formula shown in FIG. 6 and in the motion estimation part 114.

Then, the CPU 212 calculates the quantization parameter Qc (Step 81 or S81). More specifically, the CPU 212 calculates the value of the quantization parameter Qc as described above with reference to FIGS. 13-17.

Next, the CPU 212 conducts the frame skip process (Step 82 or S82). The frame skip process is one of the processes shown in FIGS. 19, 20 and 21. The frame skip setting (Step 114, Step 122 and Step 132) in each process is just a process to set the software flag in a sense that the present flame is judged to be skipped.

Then, if the software flag is set as a result of the frame skip process (Step 83: Y), the CPU 212 sets the skip flag register 132 through the host I/F 202 (Step 84 or S84). When the software flag is not set (Step 83: N), the value of the quantization parameter Qc obtained in Step 81 is set in a quantization parameter setting register 206 through the host I/F 202 (Step 85 or S85). After Step 84 and Step 85, the series of the processes is ended (END).

Returning to FIG. 23 and the explanation is continued. The encoding IC 200 initializes the motion estimation part 114 when the skip flag register 132 is set, and the generation process of the image data in the present frame is skipped.

Meanwhile, the encoding IC 200 starts the process of the DCT part 112 when the value of the quantization parameter Qc is set in the quantization parameter setting register 206. The quantization part 20 quantized the DCT coefficient (image data in a broad sense) generated by the DCT part 112 by using the quantization parameter set in the quantization parameter setting register 206 and the quantization step value in the unshown quantization table. The quantized data that is a result of the quantization is written in the FIFO buffer part 30.

At this time, the FIFO access part 34 renews the count data by incrementing the count data every time the writing into the FIFO buffer part 30 occurs in the frame. When the writing of the quantized data in to the FIFO buffer part 30 finishes, the FIFO part 208 notifies the host 210 through the host I/F 202 of the encoding completion interrupt which tells that the encoding process of the one frame is finished.

Figure 27:
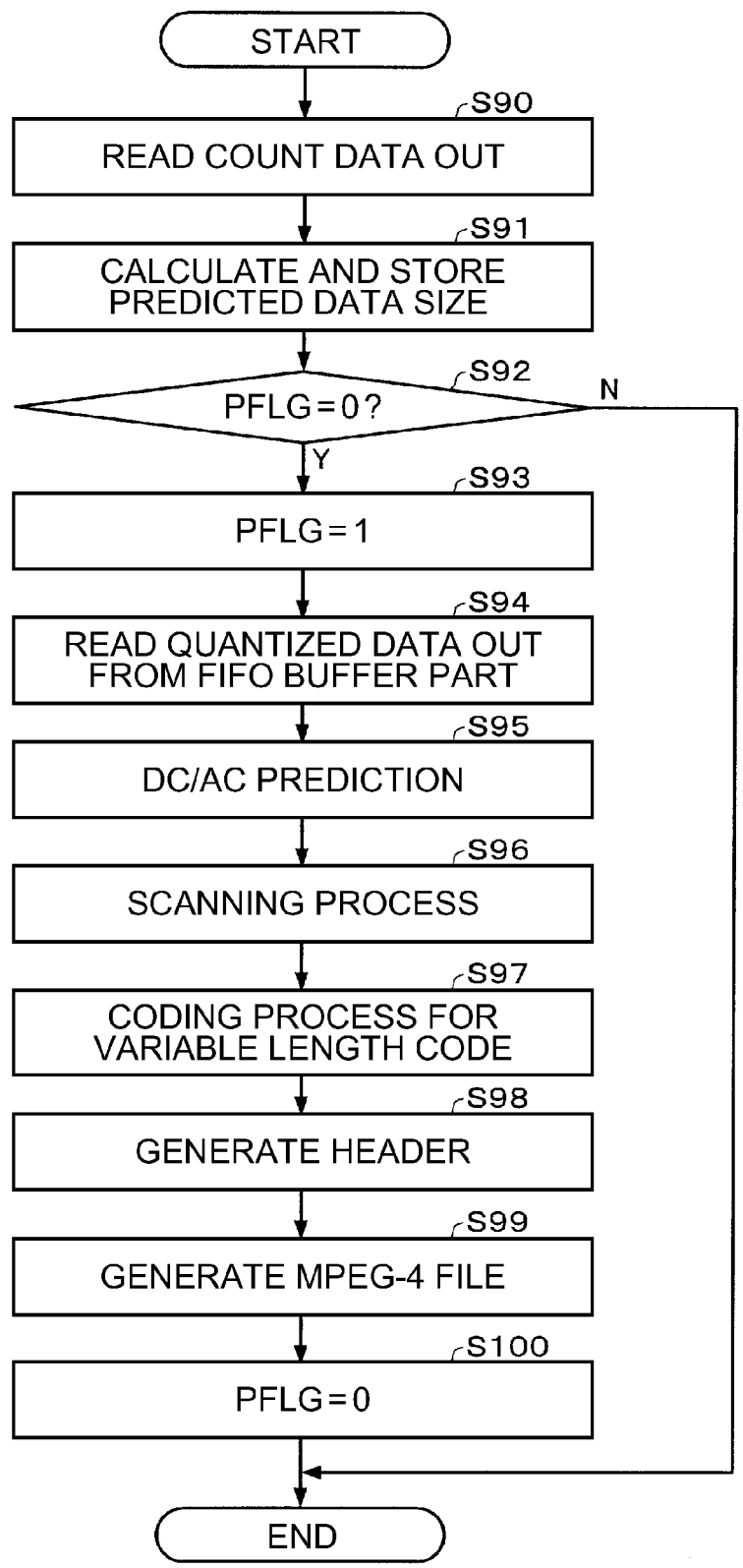
FIG. 27 is a flow diagram of an example of an encoding completion interrupt process.

FIG. 27 is an example of a flow of the encoding completion interrupt process. A program which realizes the process shown in FIG. 27 is stored in the memory 214. The CPU 212 reads this program and carries out the process shown in FIG. 27.

The encoding completion interrupt process is performed in Step 76 in FIG. 25.

When the CPU 212 detects the encoding completion interrupt, it reads out the count data stored in the count register 32 (Step 90 or S90). Next, the predicted data size $y_0$ is calculated by using the count data read out in Step 90 as the parameter $x_0$ as shown in FIG. 16 and the result is stored in a predetermined temporary space (Step 91 or S91).

Next, a process execution flag PFLG is judged to be 0 or not (Step 92 or S92). The process execution flag PFLG is a flag that shows the generation process of the coded data (processes of Steps 7-9 in FIG. 1A) is in execution or not. When the process execution flag PFLG is judged to be not 0 (Step 92: N), it is considered that the coded data formation part 40 is in execution and the series of the processes is ended (END).

In Step 92, when the process execution flag PFLG is judged to be 0 (Step 92: Y), the generation process of the coded data is carried out.

In this coded data generation process, firstly, 1 is set in the process execution flag PFLG (Step 93 or S93). By doing this, even when the encoding completion interrupt occurs in the middle of coded data generation process, it is possible to make the execution of the coded data generation for the next frame wait.

Then, the one frame worth of the quantized data is read out from the FIFO buffer part 30 in a predetermined number of bytes (Step 94 or S94).

The CPU 212 then performs the DC/AC prediction process (Step 95 or S95), the scanning process (Step 96 or S96) and the variable length code coding process (Step 97 or S97) by macro-blocks and generates the coded data.

Next, the CPU 212 adds a macro-block header to the coded data which is generated in Step 97. A one Video Object Plane (VOP) worth of the coded data which are produced in the above-described way is obtained and a GOV header and a VOP header is generated based on the obtained quantization parameter (Step 98 or S98). And then, when a predetermined number of frames worth of the encoding is finished, they are output as the MPEG-4 file (Step 99 or S99).

Following Step 99, 0 is set for the process execution flag PFLG (Step 100 or S100) and the series of the processes is ended (END).

As described above, the image data compression process is allocated to the hardware processing unit 110 and the software processing unit 150.

In order to perform the above-described rate control of the encoding IC 200, the host 210 memories a process formula which carries out the following linear transformation in this embodiment and the above-described rate control is conducted.

Figure 28:
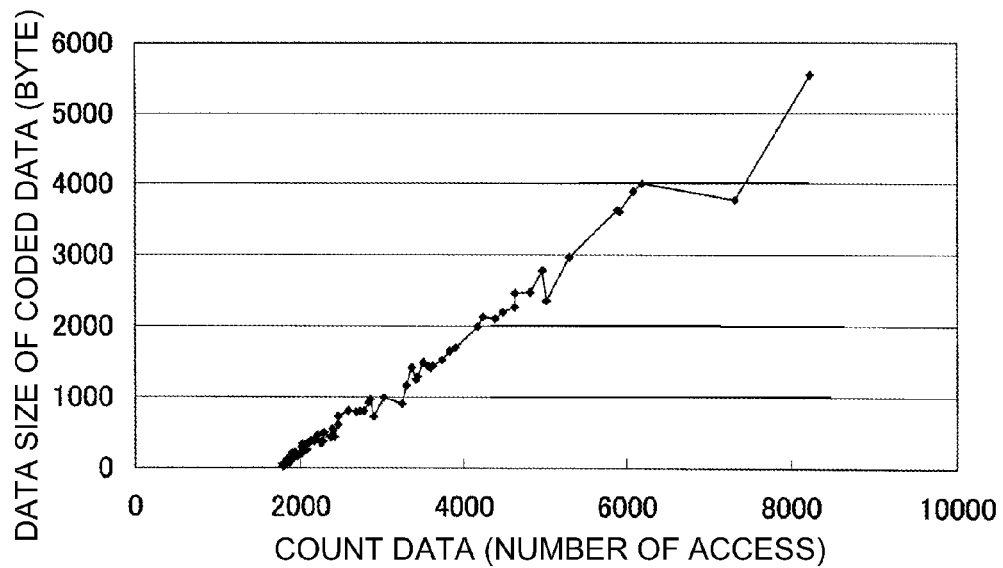
FIG. 28 is a view showing relationship between a count data and the predicted data size in the present embodiment.

FIG. 28 shows a relationship diagram between the count data and the predicted data size.

Here, the bit rate is 64 kilobits per second (kbps), the frame rate is 15 frames per second (fps) and the image data size is Quarter Common Intermediate Format (QCIF) (176×144 pixel). The horizontal axis is a count data scale which corresponds to the access number of the FIFO buffer part 30 and the vertical axis is a data size scale (number of bytes) of the coded data after the VLC coding.

From the figure, it can be found that the relationship diagram between the count data and the data size of the coded data is linear.

For example, when a is 4/5 and b is (13.5625×99×8) in the formula (1) based on the actual measurement value shown in FIG. 28, the linear relationship shown in FIG. 28 can be approximately seen. Therefore, the predicted data size can be easily obtained by using this linear transformation formula.

3.3 Advantageous Effects

Next, advantageous effects of the present embodiment are described in contrast with a comparative example of the present embodiment. When the above-described image data compression process is allocated to the hardware and the software, the FIFO buffer part 30 which absorbs their processing capabilities is needed. In this case, a comparative example, in which the quantization step is changed based on the data size of the coded data in the plurality of frames unlike the present embodiment, can be considered in order to realize the above-described rate control method.

Figure 29:
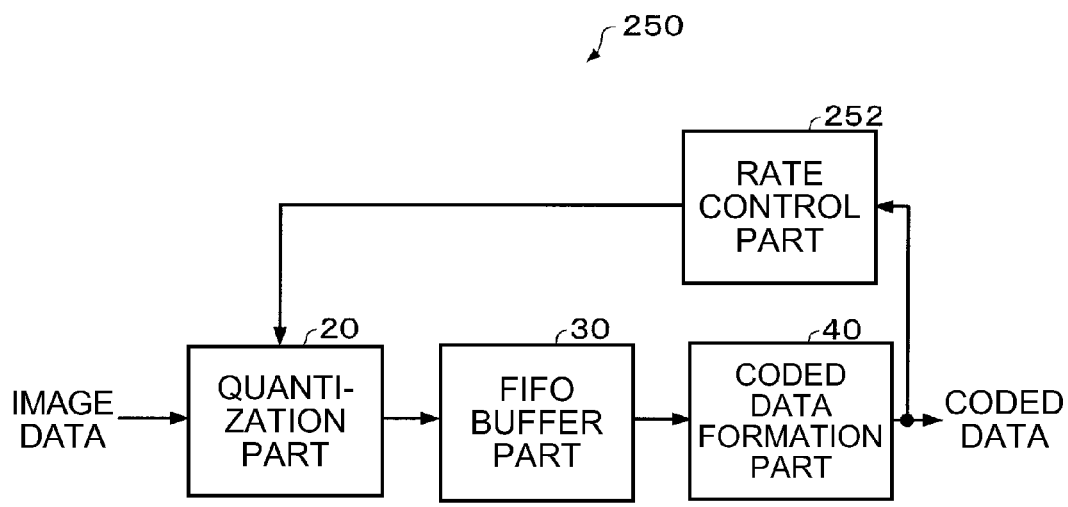
FIG. 29 is a block diagram schematically showing a structure of an image data compression device of a comparative example of the present embodiment.

FIG. 29 is a block diagram schematically showing a structure of an image data compression device according to the comparative example of the present embodiment. The same structures in an image data compression device 250 of the comparative example as those of the image data compression device 10 shown in FIG. 8 are given the identical numerals and those explanations will be accordingly omitted.

Unlike the image data compression device 10 in the present embodiment, the image data compression device 250 of the comparative example has a rate control part 252 which changes the quantization step of the quantization part 20 based on an average data size of N (where N is a integer number equal or more than 2) frames worth of the coded data.

In other words, in the comparative example, the rate control part 252 calculates the average data size by averaging the data size of the coded data in each frame which is in the N frames past from the frame of the image data that is quantized in the quantization part 20. The rate control part 252 then changes the quantization step based on the obtained average data size. For example, when the image data quantized in the quantization part 20 is in the Lth (where L is a positive integer) frame, the rate control part 252 calculates the past N frames worth of the coded data size from the Lth frame, which means the coded data size from the (L−P)th (where L>P, P is a positive integer) frame to the (L−P−N+1)th (where L−P>N−1) frame, and changes the quantization step based on the obtained average data size.

Figure 30:
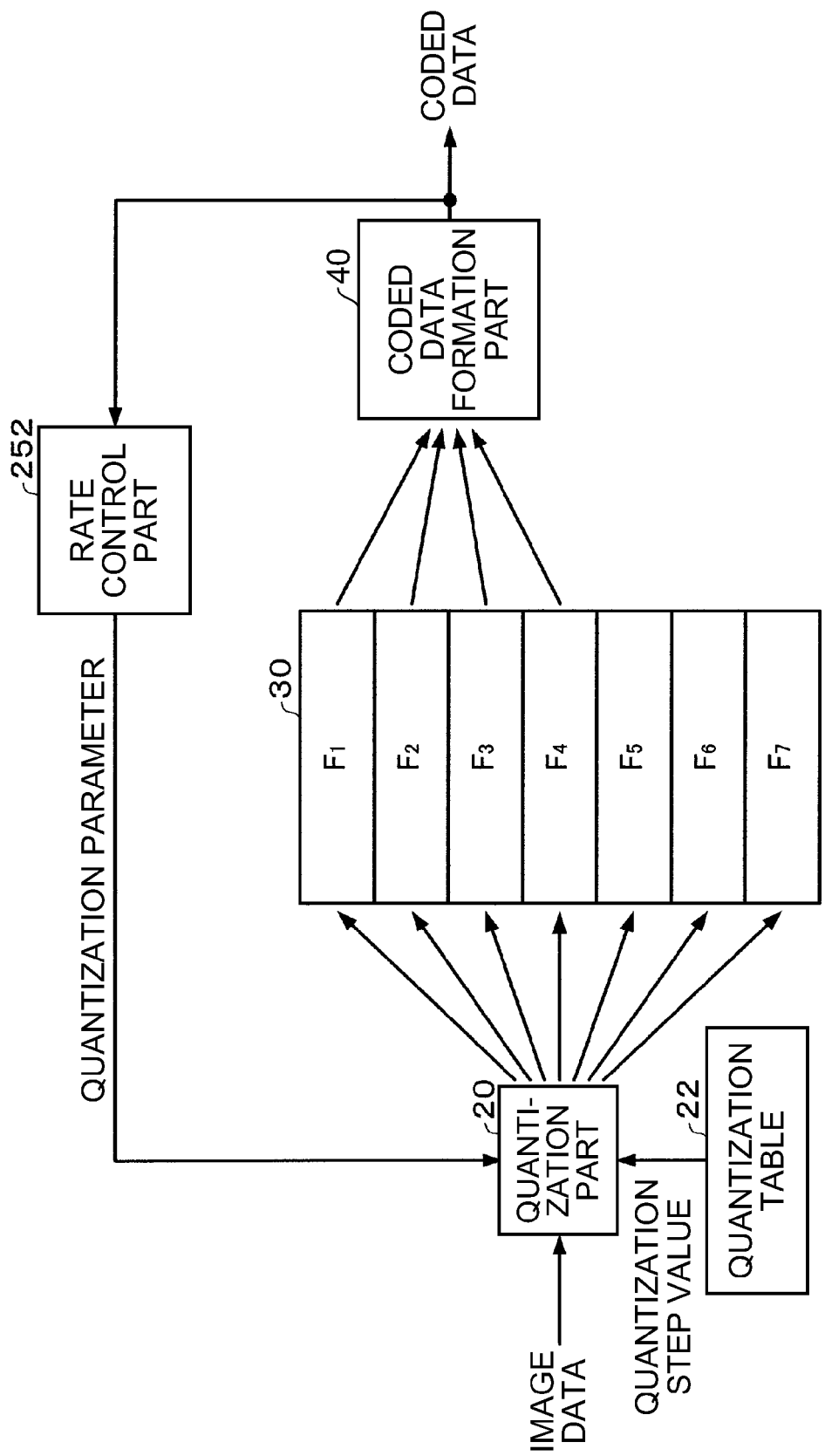
FIG. 30 is an explanatory drawing of the rate control method in the comparative example.

FIG. 30 is an explanatory drawing of the rate control method in the comparative example. The same structures as those of the image data compression device 250 shown in FIG. 29 are given the identical numerals and those explanations will be accordingly omitted.

Figure 31:
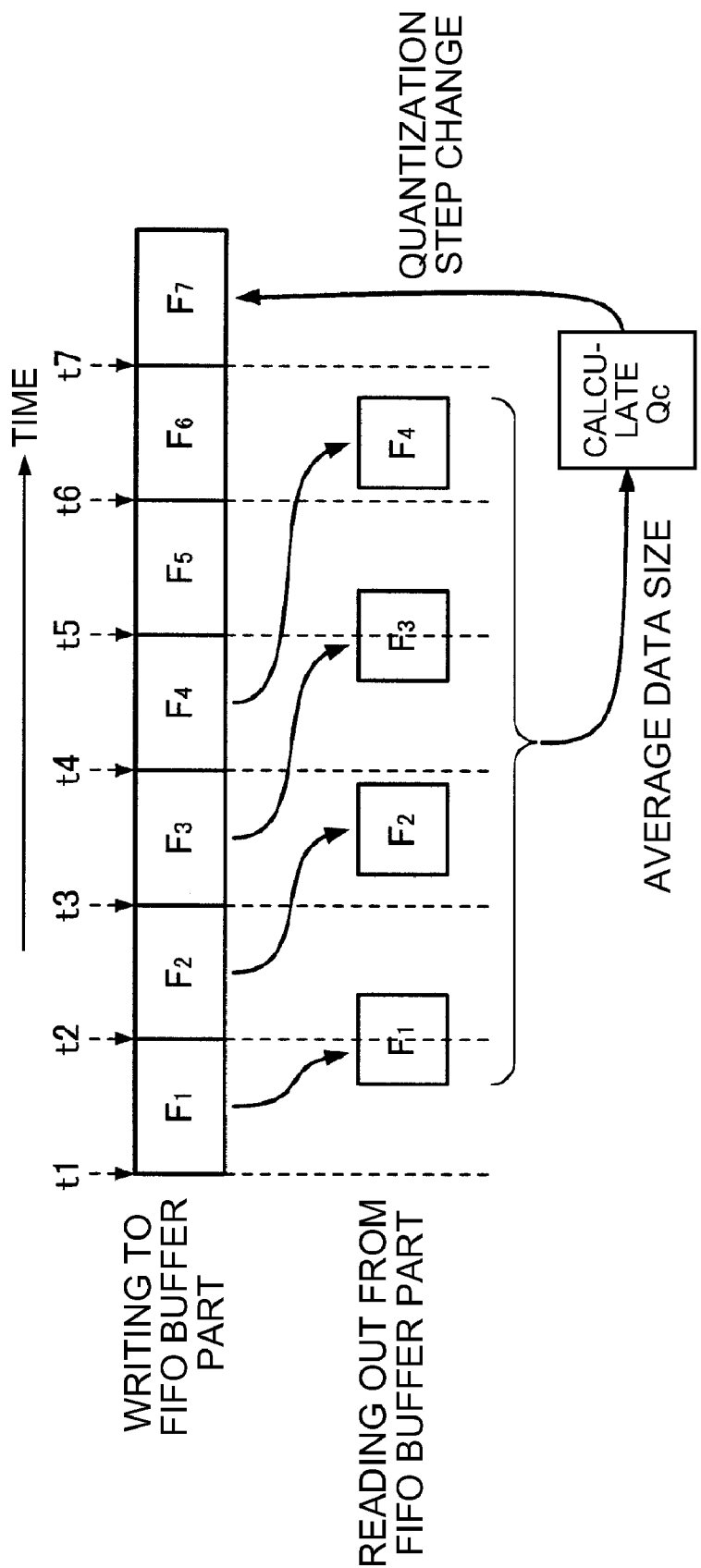
FIG. 31 is a view showing a frame format of operational timing of the rate control method shown in FIG. 30.

FIG. 31 is a view showing a frame format of operational timing of the rate control method shown in FIG. 30.

The quantization part 20 quantizes the image data by frames at time t1, t2 . . . and writes the quantized data into the FIFO buffer part 30 in order of the first frame $F_1$, the second frame $F_2$ . . . . The coded data formation part 40 reads the quantized data from the FIFO buffer part 30 by frame asynchronously with the writing of the quantized data to the FIFO buffer part 30 and carries out the coding process.

The rate control part 252 calculates the average data size by averaging the data size of the coded data in each frame which is in, for example, the four (N=4) frames past from the frame (the present frame) of the image data that is quantized in the quantization part 20. The rate control part 252 then changes the quantization step of the quantization part 20 based on the obtained average data size. The size of the quantized data quantized in the quantization part 20 is changed and the size of the coded data generated by the coded data formation part 40 also changes.

In FIG. 31, the coded data formation part 40 sequentially reads out the quantized data in the first-fourth frames $F_1$-$F_4$ from the FIFO buffer part 30 and generates the coded data in each frame and outputs them. At this time, the quantization part 20 quantizes the image data in the seventh frame $F_7$.

The rate control part 252 memorizes the coded data size in each of the first-fourth frames $F_1$-$F_4$ and calculates the average of the coded data size in each of the first-fourth frames $F_1$-$F_4$ as the average data size. The rate control part 252 then calculates the amount of codes used for the encoding of the seventh frame $F_7$ by using the average data size and obtains the quantization parameter Qc as described in FIG. 6 and FIG. 7. Accordingly, the quantization part 20 quantizes the image data of the seventh frame $F_7$ by using the product of the quantization parameter Qc calculated based on the average coded data size of the first-fourth frames $F_1$-$F_4$ and the quantization step value of the quantization table 22. This result of the quantization is written to the FIFO buffer part 30. In this way, the coded data can be generated at a desired rate.

Here, change in a volume of the free space of the VBV buffer provided in the image data compression device according to the comparative example is compared with that of the present embodiment.

Figure 32:
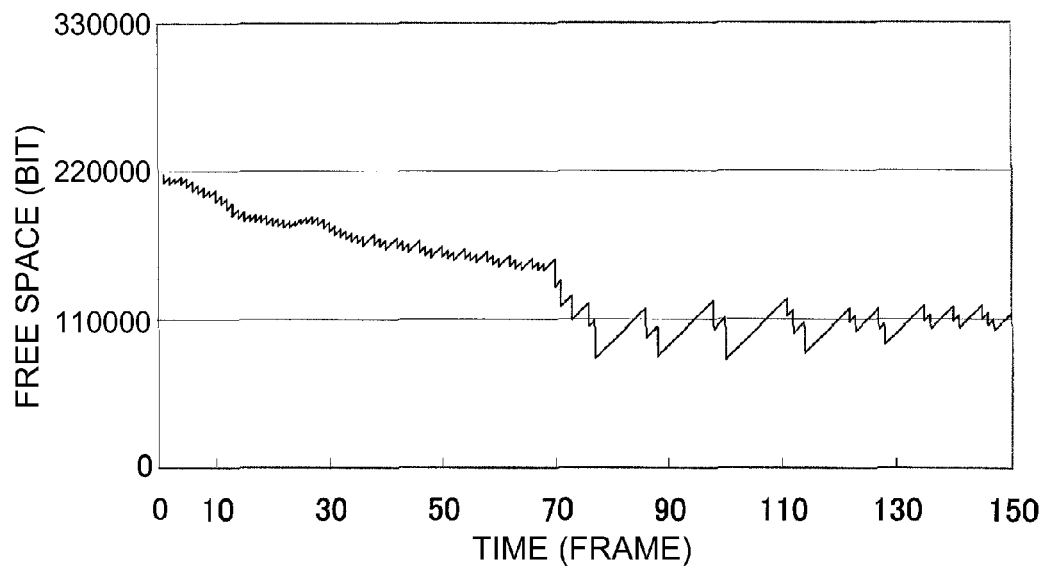
FIG. 32 shows a change in a free space volume of a VBV buffer of the comparative example.

FIG. 32 is a result of simulation showing an example of the change in the free space volume of the VBV buffer provided in the image data compression device 250 according to the comparative example.

Figure 33:
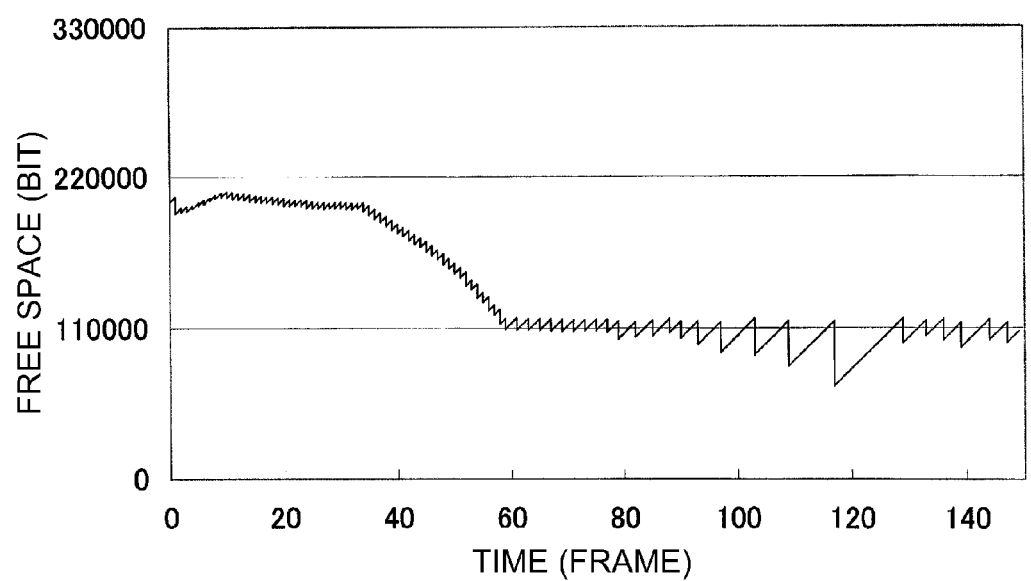
FIG. 33 shows a change in the free space volume of the VBV buffer of the present embodiment.

FIG. 33 is a result of simulation showing an example of the change in the free space volume of the VBV buffer provided in the image data compression device 10 according to the present embodiment.

In FIG. 32 and FIG. 33, the horizontal axis is the number of the frames and the vertical axis is the number of bits of the free space in the VBV buffer.

Here, the coded data is generated so as to prevent the VBV buffer from overflowing or underflowing. When the free space volume of the VBV buffer becomes smaller than a predetermined threshold (about 110,000 bits), the frame skip is conducted. This means that the encoding process is carried out in the frame at the timing when the free space becomes less. This also means that the result of the encoding process will not be outputted to the VBV buffer at the timing when the free space becomes large. In this way, the regular rate can be realized by generating the coded data so as to maintain a predetermined free space.

In FIG. 32 and FIG. 33, the total frame number is 150, the bit rate is 64 kilobits per second (kbps), the frame rate is 15 frames per second (fps), the VBV buffer size is 327,680 bits and the threshold is 109,226 bits. The average data size of the past four frames worth of the coded data is used in the comparative example. Under such conditions, FIG. 32 and FIG. 33 show the results of the simulation in which the motion picture having a small movement at the beginning and gradually an intense movement is encoded.

Taking a particular point of the threshold of 109,226 bits in the comparative example shown in FIG. 32, it shows that the encoding process is performed even though the free space volume is under the threshold, and accuracy of the rate control to achieve the regular rate is not so high. This is because the rate control result is reflected one or two frame later since the average data size of the past four frames is used.

On the other hand, in the present embodiment shown in FIG. 33, the free space is maintained so as to be around the threshold. This means that accuracy of the prediction for the predicted data size is high. In other words, accuracy to obtain the predicted data size by linearly transforming the writing number to the FIFO buffer part 30 in the previous frame is high. This also means that accuracy to control the bit rate based on the predicted data size is high. Therefore, the present embodiment has less possibility to overflow the VBV buffer compared with the comparative example.

4. Display Controller

The function of the encoding IC of the present embodiment can be applied to a display controller.

Figure 34:
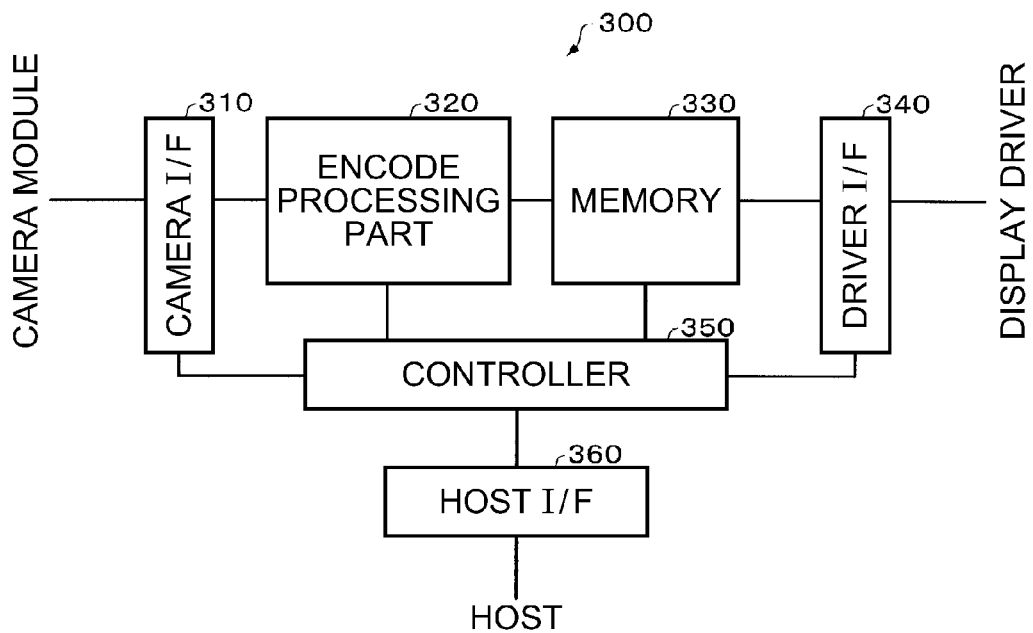
FIG. 34 is a block diagram showing a configuration example of a display controller of the present embodiment.

FIG. 34 is a block diagram schematically showing a structure of a display controller according to the present embodiment.

A display controller 300 includes a camera I/F 310, an encoding processing part 320, a memory 330, a driver I/F 340, a controller 350 and a host I/F 360.

The camera I/F 310 is coupled to an unshown camera module. This camera module outputs the image data of the motion image taken by the camera in YUV format and also outputs a synchronization signal (for example, VSYNC signal) which assigns a frame separation. The camera I/F 310 performs an interface process in order to receive the input image data of the motion image generated in the camera module.

The encoding processing part 320 has all the functions of the encoding IC 200 shown in FIG. 23 other than the functions of the host I/F 202 and the camera I/F 204. In other words, the encoding processing part 320 has the functions of the quantization part 20, the FIFO part 208, the DCT part 112, the motion estimation part 114, the inverse quantization part 116, the inverse DCT part 118, the motion compensation part 120, the quantization parameter setting register 206, the software start-up flag register 130 and the skip flag register 132 shown in FIG. 23.

The memory 330 memories the coded data which is an output of the encoding processing part 320. The memory 330 also memorizes the image data which is to be displayed on a display panel. The driver I/F 340 reads out the image data from the memory 330 at a predetermined frequency and supplies the image data to a display driver that drives the display panel. The driver I/F 340 performs an interface process in order to send the image data to the display driver.

The controller 350 controls the camera I/F 310, the encoding processing part 320, the memory 330 and the driver I/F 340. The controller 350 conducts a receiving process of the input image data from the camera module, the encoding process of the input image data, the writing process of the coded data to the memory 330, a reading out process of the image data for display from the memory 330 and a sending process of the image data to the display driver, for example, through the host I/F 360 and according to instructions from an unshown host.

Figure 35:
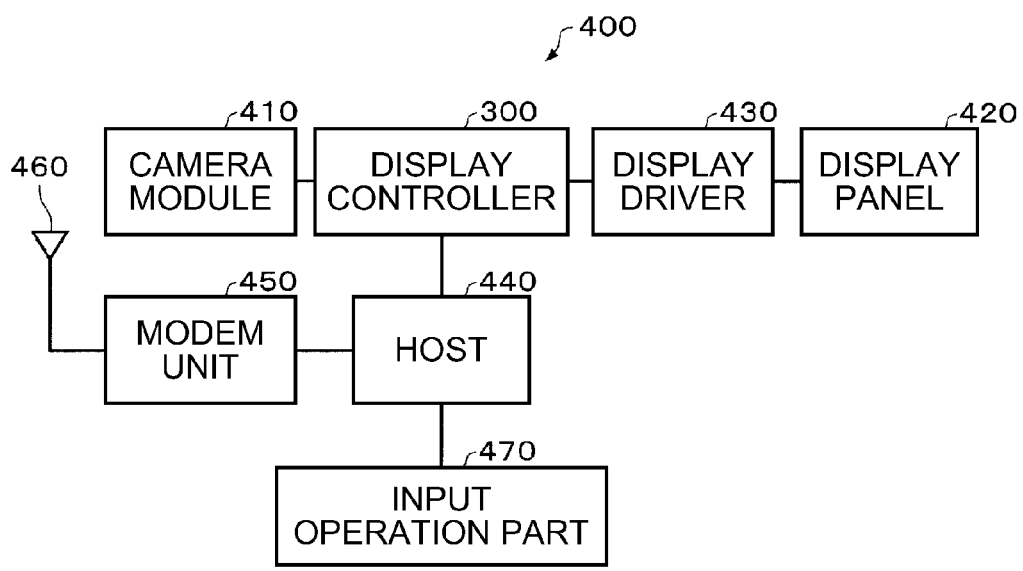
FIG. 35 is a block diagram showing a configuration example of electronic equipment to which the display controller shown

FIG. 35 is a block diagram schematically showing a structure of electronic equipment to which the display controller shown FIG. 34 is applied. Here, as the electronic equipment, a cellular phone is taken as an example and a block diagram of the configuration example of the cellular phone is shown. The same structures as those in FIG. 34 are given the identical numerals and those explanations will be accordingly omitted.

A cellular phone 400 includes a camera module 410. The camera module 410 includes a Charge-Coupled device (CCD) camera and supplies an image data taken by the CCD camera in YUV format to the display controller 300.

The cellular phone 400 includes a display panel 420. As the display panel 420, a liquid crystal display panel can be adopted. In this case, the display panel 420 is driven by a display driver 430. The display panel 420 includes the plurality of scan lines, the plurality of data lines and the plurality of picture elements. The display driver 430 has a function of a scan driver which is to select a one scan line or a few scan lines out of the plurality of scan lines and a function of a data driver which is to supply a voltage that corresponds to the image data to the plurality of data lines.

The display controller 300 is coupled to the display driver 430 and supplies the image data to the display driver 430.

A host 440 is coupled to the display controller 300. The host 440 controls the display controller 300. The host 440 can also decode the image data received through an antenna 460 in a modem unit 450 and supply the decoded data to the display controller 300. The display controller 300 displays the display panel 420 by the display driver 430 based on the image data.

The host 440 also has the function of the host 210 shown in FIG. 23. The host 440 can encode the image data generated in the camera module 410 and modulate the encoded data in the modem unit 450. The host 440 can then instruct to send them to other communication devices through the antenna 460. At this time, the display controller 300 can encode the image data generated in the camera module 410 and output the coded data obtained by the encoding to the host 440.

The host 440 performs the sending or receiving process of the image data, the encoding process, a process of taking images by the camera module 410 and a display process of the display panel according to instructional information from an input operation part 470.

Though the liquid crystal panel is described as the example of the display panel 420 in FIG. 35, the case is not limited to this. The display panel 420 may be an electroluminescence or plasma display device and the present invention can be applied to the display controller which supplies image data to a display driver that drives these devices.

The present invention is not limited to the above-described embodiments but applied to various kinds of modifications within the scope and spirit of the present invention.

In inventions according to the dependent claims of the present invention, a part of the components appear in the independent claim may be omitted. Essential parts of the independent claim of the present invention may depend on other independent claim.

What is claimed is:

1. An image data compression device to compress image data of a motion image, the image data compression device comprising:

a motion estimation part that receives input image data of a present frame of the motion image and that generates motion vector data based on a difference between the input image data of the present frame and previous image data of a previous frame of the motion image;

a quantization part that generates quantized image data, based on the motion vector, with a quantization step that varies based on a quantization parameter;

a coded data formation part that generates coded data by encoding the quantized image data;

a FIFO buffer part buffering the quantized image data generated by the quantization part;

a rate control part that controls a data size of the coded data by changing the quantization parameter of the quantization part, the rate control part calculating a predicted data size of the coded data based on a number of accesses being made to the FIFO buffer part, calculating the quantization parameter of the quantization part based on the predicted data size, and controlling a bit rate of the image data compression device based on the predicted data size;

the motion estimation part halting the generation of the motion vector data when a predetermined bit rate cannot be realized.

2. The image data compression device according to claim 1, the motion estimation part generating the motion vector data such that a summation of values of an absolute difference between each pixel value of the input image data and a corresponding pixel value of the previous image data is minimized.

3. The image data compression device according to claim 1, further comprising:

a skip flag register that stores a skip flag value, the motion estimation part halting the generation of the motion vector data when the skip flag register is set.

4. The image data compression device according to claim 1, further comprising:

a discrete cosine transformation part that performs a discrete cosine transformation on the motion vector data and provides the transformed motion vector data to the quantization part; and an inverse quantization part that generates the previous image data based on inversely quantized data obtained by inversely quantizing quantized image data previously quantized by the quantization step of the quantization part.

* * * * *